(12) United States Patent
Sekhar Rao

(10) Patent No.: US 12,526,143 B2
(45) Date of Patent: Jan. 13, 2026

(54) METHODS AND SYSTEMS FOR PERFORMING SECURE CLICKLESS AUTHENTICATION

(71) Applicant: Balaga Sekhar Rao, Bangalore (IN)

(72) Inventor: Balaga Sekhar Rao, Bangalore (IN)

( * ) Notice: Subject to any disclaimer, the term of this patent is extended or adjusted under 35 U.S.C. 154(b) by 298 days.

(21) Appl. No.: 18/247,199

(22) PCT Filed: Sep. 30, 2021

(86) PCT No.: PCT/IN2021/050949
§ 371 (c)(1),
(2) Date: Mar. 29, 2023

(87) PCT Pub. No.: WO2022/070212
PCT Pub. Date: Apr. 7, 2022

(65) Prior Publication Data
US 2024/0048381 A1 Feb. 8, 2024

(30) Foreign Application Priority Data
Sep. 30, 2020 (IN) .............................. 202041042551

(51) Int. Cl.
*H04L 9/32* (2006.01)
(52) U.S. Cl.
CPC ............ *H04L 9/321* (2013.01); *H04L 9/3226* (2013.01); *H04L 9/3271* (2013.01)

(58) Field of Classification Search
CPC ..... H04L 9/321; H04L 9/3226; H04L 9/3271; G06F 21/33; G06F 21/31
See application file for complete search history.

(56) References Cited

U.S. PATENT DOCUMENTS

2016/0381038 A1* 12/2016 Disraeli .............. H04L 63/0853 726/7
2018/0343247 A1* 11/2018 Kim .................... H04L 63/0861

* cited by examiner

*Primary Examiner* — Izunna Okeke
(74) *Attorney, Agent, or Firm* — Patshegen IP; Moshe Pinchas

(57) ABSTRACT

Methods and systems for performing secure clickless authentication. Embodiments herein disclose a registration process, and an authentication process for at least one user, who wants to perform at least one web-based transaction using at least one application, wherein the registration process is performed using at least one user input, and the authentication process is performed without using any user inputs/gestures. The registration process involves generating cryptographic shares by validating the user, based on at least one of, the device fingerprint of the user device, the device numbers/mobile numbers associated with the user and multiple cryptographic objects. The authentication process involves authenticating the user based on the static or dynamically generated cryptographic shares during the registration process and subsequent authentication processes.

30 Claims, 14 Drawing Sheets

METHODS AND SYSTEMS FOR PERFORMING SECURE CLICKLESS AUTHENTICATION

CROSS REFERENCE TO RELATED APPLICATION

This application is based on and derives the benefit of Indian Provisional Application 202041042551 filed on 30 Sep. 2020, the contents of which are incorporated herein by reference.

TECHNICAL FIELD

Embodiments disclosed herein relate to authentication techniques, and more particularly to performing clickless authentication.

BACKGROUND

With increase in use of the Internet for accessing information, security systems are implemented with various authentication methods to verify an identity of a user. Existing authentication methods use at least one of, but is not limited to, text passwords, graphical passwords, One Type Passwords (OTPs), digital certificates, and so on, to authenticate the user. However, an adversary/third party/hacker may collect the passwords, OTPs, the digital certificates, and so on, using software programs (such as Internet/computer bots, programs for distributed denial of service (DDOS) attacks, and so on) and interact with the particular system for malicious purposes. Further, if the user forgets the passwords, or enters the wrong passwords, or enters a wrong OTP, the user has to repeat the process, which may increase time consumption. Thus, the existing authentication methods have drawbacks in terms of time consumption, memorability, and security.

OBJECTS

The principal object of embodiments herein is to disclose methods and systems for performing clickless authentication.

Another object of embodiments herein is to disclose methods and systems for initiating a registration process prior to performing at least one transaction by a user using at least one application, wherein the registration process involves generation of cryptographic shares based on at least one of, a device fingerprint of a user device, a device number/mobile number, a user consent received from the user with respect to an enforcement challenge, and cryptographic objects.

Another object of embodiments herein is to disclose methods and systems for performing the authentication of the user based on static or dynamically generated cryptographic shares during the registration process and subsequent authentication processes.

Another object of embodiments herein is to disclose methods and systems for performing a fraud/threat analysis using a machine learning model during the registration process, and the authentication of the user.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, through out which like reference letters indicate corresponding parts in the various figures. The embodiments herein will be better understood from the following description with reference to the drawings, in which.

DETAILED DESCRIPTION

Figure 1:
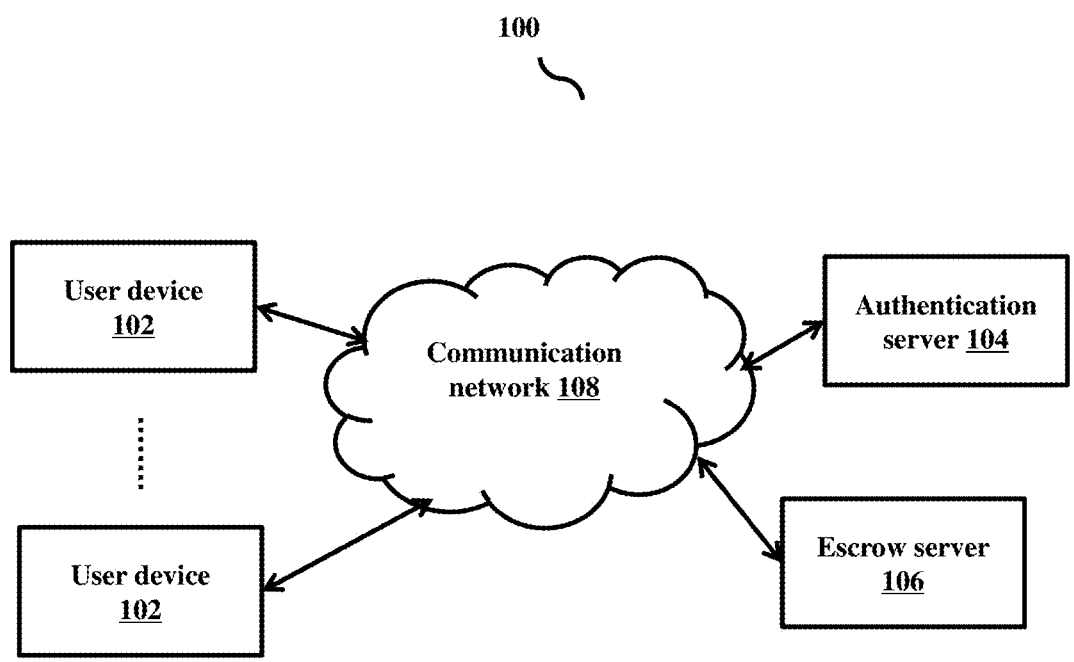
FIG. 1 depicts an authentication system for performing clickless authentication, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for performing clickless authentication of a user. Referring now to the drawings, and more particularly to FIGS. 1 through 11, where similar reference characters denote corresponding features consistently throughout the figures, there are shown embodiments.

FIG. 1 depicts an authentication system 100 for performing clickless authentication, according to embodiments as disclosed herein. The authentication system 100 referred herein may be configured for performing a clickless authentication to verify an identity of a user. The user referred herein may be an individual, or an organization, who can use at least one application for performing at least one transaction. Examples of the at least one application to perform the transaction may be, but are not limited to, a navigation application, a riding application, a calendar application, a health and fitness application, a weather application, a camera application, a web browser, a video streaming application, a payment application, a financial application, an education application, a news application, a shopping application, a social networking application, a utility application and so on. In an embodiment, the transaction referred herein may be an online web-based transaction. Examples of the transaction may be accessing services/information/data, making a payment, filling webforms, submitting webforms, interacting with websites, and so on.

In an embodiment, the authentication system 100 may facilitate the authentication of the user without receiving any inputs or gestures from the user. Examples of the inputs may be, but are not limited to, information such as user credentials (for example, user ID, password, or the like), personal information (for example, a contact number, a date of birth, and so on), text, images, and so on. Examples of the gestures may be, but are not limited to, a click gesture, a swipe gesture, a drag gesture, a trace gesture, a touch gesture, or any other gesture performed on any content (for example, text, images, videos, icons, or the like).

The authentication system 100 includes at least one user device 102, an authentication server 104, and an escrow server 106.

The user device 102 referred herein may be any electronic device used by the user for performing the at least one transaction using at least one application. Examples of the user device 102 may be, but are not limited to, a mobile phone, a smart phone, a tablet, a computer, a wearable computing device, an IoT (Internet of Things) device, a vehicle instrument console, a vehicle infotainment system, an android or smart TV and so on. The user device 102 may communicate with the authentication server 104 using a communication network 108. Examples of the communication network 108 may be, but are not limited to, the Internet, a wireless network (a Wi-Fi network, a cellular network, a Wi-Fi Hotspot, Bluetooth, Zigbee and or the like), a wired network, and so on. The user device 102 also includes the at least one application/Software Development Kit (SDK) provided by the authentication server 104 in its memory 202. The at least one application/SDK can be executed on the controller/processor to perform the registration and authentication process.

The authentication server 104 may be configured to authenticate the user of the user device 102. The escrow server 106 may be a trusted third-party server. In an embodiment, the escrow server 106 may be a part of the authentication server 104. In another embodiment, the escrow server 106 may be an independent server. Examples of the authentication server 104 and the escrow server 106 may be, but are not limited to, a cloud computing device (can be a part of a public cloud or a private cloud), a server, a computing device, and so on. The server may be at least one of a standalone server, a server on a cloud, or the like. Examples of the computing device may be, but are not limited to, a personal computer, a notebook, a tablet, desktop computer, a laptop, a handheld device a mobile device, and so on. The authentication server 104 and the escrow server 106 may be associated with a storage unit. Examples of the storage unit may be, but are not limited to, a database, a memory, a file server, a cloud storage, and so on.

Prior to performing the transaction using the at least one application, the user device 102 performs a registration process with the authentication server 104 and receives cryptographic shares for the at least one application. The user device 102 may perform the registration process, when the user wants to execute the application(s) to perform the at least one transaction. For the registration process, the user device 102 extracts device fingerprint using the SDK/the application provided by the authentication server 104. The device fingerprint may include attributes related to the software, and hardware modules of the user device 102. Examples of the attributes of the software, and hardware modules of the user device 102 may be, but are not limited to, an Internet Protocol (IP) address, an application identifier (ID) corresponding to the currently executing application, Hyper Text Transfer Protocol (HTTP) request headers, installed plugins, a user time zone, information about the user device 102 (for example: screen resolution, touch support, an operating system, a language, and so on), flash data provided by flash plugins, a list of installed fonts, a list of mime-types, timestamps, Hyper Text Markup language 5 (HTML5) storage support (for example; at least one of: a local storage, a session storage, a remote storage, data located within these storage areas, and so on), browser plugin names or versions, and so on.

On extracting the device fingerprint, the user device 102 sends the device fingerprint to the authentication server 104 through the communication network 108. In an embodiment, the communication network 108 may add a Mobile Station International Subscriber Directory Number (MSISDN) to the device fingerprint and sends the device fingerprint and the MSISDN to the authentication server 104, if the communication network 108 is at least one of, but is not limited to, a cellular network, or the like. In an embodiment, the communication network 108 may send the device fingerprint of the user device 102 to the authentication server 104 without adding the MSISDN of the user, if the communication network 108 is at least one of, but not limited to, a Wi-Fi network, or the like.

On receiving the device fingerprint, the authentication server 104 checks if the received device fingerprint of the user device 102 is associated with the MSISDN. If the received device fingerprint of the user device 102 is associated with the MSISDN, the authentication server 104 identifies a device number/mobile number/SIM id/OS id/application id number of the user device 102 using the MSISDN. In an example, the device number may be a device identifier of the user device 102, a subscriber identity module (SIM) identifier, an operating system id (OS), an application id or the like. In another example, the device number may be a mobile number of the user device 102.

If the received device fingerprint of the user device 102 does not associate with the MSISDN, the authentication server 104 sends a request/enables the SDK/the at least one application present in the user device 102 to trigger a generation of a message. In an example, the message may be, but is not limited to, a Short Messaging Service (SMS), or the like. The user device 102 sends the generated message to the authentication server 104 through the communication network 108. On receiving the message, the authentication server 104 identifies the device number/mobile number/SIM id/OS id/application id number of the user device 102 using the received message.

In an embodiment, on identifying the device number/mobile number/SIM id/OS id/application id number of the user device 102, the authentication server 104 may perform a verification of the device number/mobile number/SIM id/OS id/application id number. In another embodiment, the authentication server 104 may perform a verification of the device number/mobile number/SIM id/OS id/application id number may not perform the verification of the device number/mobile number/SIM id/OS id/application id number. The verification of the device number/mobile number/SIM id/OS id/application id number may be associated with an enforcement challenge. The authentication server 104 sends an enforcement challenge request to the user in response to the identified device number/mobile number/SIM id/OS id/application id number of the user device 102. In an example, the enforcement challenge may be in a form of a cryptographic (crypto) image. In another example, the enforcement challenge may be in a form of a crypto text, a crypto video, and so on. The enforcement challenge request may include a Yes or No option. If the user wants to accept enforcement challenge, the user may select the Yes option provided in the enforcement challenge request/crypto-image. If the user does not want to accept the enforcement challenge, the user may select the No option provided in the enforcement challenge request/crypto-image. The user provides a user consent/user response to the authentication server 104 through the user device 102. The user consent may include the Yes option or the No option, which has been selected by the user. The authentication server 104 verifies the device number/mobile number/SIM id/OS id/application id number by validating the user consent/user response received from the user.

On identifying the device number/mobile number/SIM id/OS id/application id number of the user device 102 or verifying the device number/mobile number/SIM id/OS id/application id number of the user device 102, the authentication server 104 generates one or more cryptographic objects (crypto-objects)/crypto-noise for the user of the user device 102. The authentication server 104 may use suitable techniques such as, but are not limited to, a Red Green Blue alpha (RGBA) variation technique, a quasi-group technique, or a combination thereof to generate the one or more crypto-objects. Generation of the one or more crypto-objects using the suitable techniques is disclosed in detail in Indian Patent Application number 202041027184. In an example, the one or more crypto-objects may be, but are not limited to, a plurality of media objects (images, audios, videos, animations, and so on), text, a plurality of characters (for example: letters, numerals, signs, special characters, and so on), a plurality of words, vernacular options, a plurality of pin codes, user specific details (for example: date of birth, pet names, and so on), a plurality of icons, single choice selectable options (for example; "Yes" or "No" options), and so on. In an embodiment, the authentication server 104 also generates a code for the generated one or more crypto-objects. The code can include a set of instructions for the user to select the one or more crypto-objects by performing at least one gesture. Examples of the gesture may be, but are not limited to, a touch gesture, a click gesture, a drag gesture, a swipe gesture, and so on. The authentication server 104 sends the generated one or more crypto-objects and the associated code to the user device 102 to be displayed to the user.

On receiving the one or more crypto-objects, the user device 102 sends a user crypto consent to the authentication server 104. The user crypto consent can be the selection of the one or more crypto-objects by the user in accordance with the code associated with the one or more crypto-objects. Even if the user device 102 is compromised by malware, third party hackers may not be able to remotely access the user device 102 for viewing the crypto-objects and/or providing the user crypto consent related to the crypto-objects.

On receiving the user crypto consent from the authentication server 104, the authentication server 104 validates the user of the user device 102 based on the received user crypto consent. If the user has selected the one or more crypto-objects in accordance with the code, the authentication server 104 determines that the user is a valid user. If the user has not selected the one or more crypto-objects in accordance with the code, the authentication server 104 determines that the user is an invalid user. On determining that the user is the invalid user, the authentication server 104 sends a registration failure message to the user device 102.

On determining that the user is the valid user, the authentication server 104 generates a plurality of cryptographic shares (also be referred as cryptographic tokens). In an example, the cryptographic shares may be images that have been divided into two or more sub-images.

In an embodiment, the authentication server 104 generates the plurality of cryptographic shares based on at least one of, but not limited to, the device fingerprint, the device number/mobile number/SIM id/OS id/application id number of the user device 102, the user consent received from the user in response to the enforcement challenge request, the crypto-objects generated for the validation of the user of the user device 102, an identifier of the application, and so on. In another embodiment, the authentication server 104 generates the plurality of cryptographic shares based on at least one of, but not limited to, the device fingerprint, the device number/mobile number/SIM id/OS id/application id number of the user device 102, the crypto-objects generated for the validation of the user of the user device 102, an identifier of the application, and so on. Thus, the authentication server 104 may generate the plurality of cryptographic shares using or without using the user consent received in response to the enforcement challenge request.

The authentication server 104 also generates a transaction identifier (TXID) for the application for which the user device 102 has initiated the registration process.

On generating the plurality of cryptographic shares, the authentication server 104 allocates and distributes/splits the plurality of cryptographic shares among the user device 102, the authentication server 104 and the escrow server 106. The authentication server 104 allocates at least one of the plurality of cryptographic shares for itself. In an embodiment, the at least one cryptographic share of the authentication server 104 is referred hereinafter as at least one authentication server cryptographic share through the document. The authentication server 104 allocates and sends at least one of the plurality of cryptographic shares to the escrow server 106. In an embodiment, the at least one cryptographic share allocated for the escrow server 106 is referred hereinafter as at least one escrow server cryptographic share through the document. The authentication server 104 allocates and sends at least one of the plurality of cryptographic shares to the user device 102 in a successful registration message. The authentication server 104 also sends the TXID for the application to the user device 102. In an embodiment, the at least one cryptographic share allocated for the user device 102 is referred hereinafter as at least one user device cryptographic share through the document.

The authentication server 104 also creates and stores an authentication server mapping in the associated database. The authentication server mapping includes a mapping of the at least one authentication server cryptographic share with the device fingerprint of the user device 102, the at least one user device cryptographic share, the device number/mobile number/SIM id/OS id/application id number of the user device 102, the user consent received in response to the enforcement challenge request (the user consent may be optional), the crypto-objects used for validation of the user of the user device 102, and the application ID. The authentication server 104 also stores the plurality of cryptographic shares generated with respect to the user device 102 in the associated database.

The escrow server 106 stores an escrow server mapping in the associated database, wherein the escrow server mapping includes a mapping of the at least one escrow server cryptographic share with the device fingerprint of the user device 102.

The user device 102 stores a user device mapping in its memory 202. The user device mapping includes a mapping of the at least one user device cryptographic share with the application ID and the TXID of the application.

Embodiments herein enable the user device 102 to send an authentication request to the authentication server 104 for the authentication, when the user wants to perform the transaction using the application for which the registration is performed successfully and enable the authentication server 104 to authenticate the user/user device 102 for performing the transaction. The user device 102 uses the SDK and fetches the user device mapping for the application that has to be used by the user device 102 to perform the transaction. The user device 102 extracts the device fingerprint, the TXID, and the at least one user device cryptographic share of the application from the fetched user device mapping. The user device 102 sends the extracted device fingerprint, the TXID, and the at least one user device cryptographic share related to the application in the authentication request to the authentication server 104.

On receiving the authentication request from the user device 102, the authentication server 104 initiates the authentication of the user. For performing the authentication of the user, the authentication server 104 decrypts the received at least one user device cryptographic share to obtain the device fingerprint, the device number/mobile number/SIM id/OS id/application id number, the user consent (may be considered as an optional parameter), and the crypto-objects. The authentication server 104 fetches the authentication server mapping from the associated database and extracts the stored at least one user device cryptographic share, the device fingerprint, the device number/mobile number/SIM id/OS id/application id number, the user consent, and the crypto-objects for the received at least one user device cryptographic share from the user in the authentication request. If at least one of, the received device fingerprint, device number/mobile number/SIM id/OS id/application id number, user consent, and crypto-objects does not match with the extracted device fingerprint, device number/mobile number/SIM id/OS id/application id number, user consent, and crypto-objects from the authentication server mapping respectively, then the authentication server 104 sends an authentication failure message to the user device 102.

If the received device fingerprint, device number/mobile number/SIM id/OS id/application id number, user consent, and crypto-objects match with the extracted device fingerprint, device number/mobile number/SIM id/OS id/application id number, user consent, and crypto-objects from the authentication server mapping respectively, the authentication server 104 requests the escrow server 106 and receives the at least one escrow server cryptographic share for the received device fingerprint of the user device 102.

The authentication server 104 combines the at least one authentication server cryptographic share, the at least one user device cryptographic share, and the at least one escrow server cryptographic share. The authentication server 104 fetches the plurality of cryptographic shares generated at the time of the registration process using the stored mapping of the plurality of cryptographic shares with the device fingerprint of the user device 102. The authentication server 104 matches the combined at least one authentication server cryptographic share, the at least one user device cryptographic share, and the at least one escrow server cryptographic share with the plurality of cryptographic shares. If the combined at least one authentication server cryptographic share, the at least one user device cryptographic share, and the at least one escrow server cryptographic share does not match with the plurality of cryptographic shares, the authentication server 104 sends the authentication failure message to the user device 102.

If the combined at least one authentication server cryptographic share, the at least one user device cryptographic share, and the at least one escrow server cryptographic share matches with the plurality of cryptographic shares, the authentication server 104 determines that the user of the user device is an authenticated user and sends a successful authentication message to the user device 102.

On sending the successful authentication message to the user device 102, the authentication server 104 destroys the stored plurality of cryptographic shares with respect to the device fingerprint of the user device 102. The authentication server 104 then generates a new plurality of cryptographic shares for the user device 102 and a new TXID for the application of the user device 102. The authentication server 104 distributes the generated new plurality of cryptographic shares among the user device 102, the authentication server 104, and the escrow server 106. The new plurality of cryptographic shares can be used for at least one subsequent authentication process. Thus, the cryptographic shares can be generated dynamically for each authentication process. Such an authentication process does not prone to third party attacks since it may be difficult for a third party/adversary/hacker to obtain the dynamically generated and distributed plurality of cryptographic shares.

In an embodiment, during the registration process and the authentication of the user, the authentication server 104 and/or machine learning module (also be referred as a machine learning model) may perform a fraud analysis/threat analysis. The authentication server 104/the machine learning module performs the fraud analysis to eliminate frauds such as, but are not limited to, invalid user onboarding, unlocking sensitive information, carrying out fraudulent transactions, and so on. Performing the fraud analysis further reassures that the user device 102 is verified.

For performing the fraud analysis, the authentication server 104/the machine learning module triggers a call for the user device 102. In an embodiment, the authentication server 104/the machine learning module may trigger for the user device 102 by itself. In another embodiment, the authentication server 104/the machine learning module may enable an external server/entity (not shown) to trigger the call for the user device 102. On detecting the call, the user device 102 terminates the call and sends a calling number to the authentication server 104/the machine learning module. The authentication server 104/the machine learning module processes/verifies the received calling number to perform the fraud analysis.

Examples of the machine learning module used for performing the fraud analysis may be, but are not limited to, an Artificial Intelligence (AI) model, a multi-class Support Vector Machine (SVM) model, a Convolutional Neural Network (CNN) model, a deep neural network (DNN) model, a recurrent neural network (RNN) model, a restricted Boltzmann Machine (RBM) model, a deep belief network (DBN) model, a bidirectional recurrent deep neural network (BRDNN) model, generative adversarial networks (GAN) model, a regression based neural network model, a deep reinforcement model (with ReLU activation), a deep Q-network, and so on. The machine learning module may include a plurality of nodes, which may be arranged in the layers. Examples of the layers may be, but are not limited to, a convolutional layer, an activation layer, an average pool layer, a max pool layer, a concatenated layer, a dropout layer, a fully connected layer, a SoftMax layer, and so on. Each layer has a plurality of weight values and performs a layer operation through calculation of a previous layer and an operation of a plurality of weights/coefficients.

The machine learning module may be trained using at least one learning method to perform the fraud analysis. Examples of the learning method may be, but are not limited to, supervised learning, unsupervised learning, semi-supervised learning, reinforcement learning, regression-based learning, and so on. The trained machine learning module may be a neural network model in which a number of layers, a sequence for processing the layers and parameters related to each layer may be known and fixed for performing the fraud analysis. Examples of the parameters related to each layer may be, but are not limited to, activation functions, biases, input weights, output weights, and so on, related to the layers of the machine learning module. A function associated with the learning method may be performed through the non-volatile memory, the volatile memory, and a controller 308 of the authentication server 104. The controller 308 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU). The one or a plurality of processors may perform the fraud analysis in accordance with a predefined operating rule of the machine learning module, stored in the non-volatile memory and the volatile memory. The predefined operating rules of the machine learning module are provided through training the modules using the learning method.

Here, being provided through learning means that, by applying the learning method to a plurality of learning data, a predefined operating rule or the machine learning module of a desired characteristic is made. The fraud analysis may be performed by the authentication server 104 itself in which the learning according to an embodiment is performed, and/or may be implemented through a separate server/system.

FIG. 1 show exemplary units of the authentication system 100, but it is to be understood that other embodiments are not limited thereon. In other embodiments, the authentication system 100 may include less or more number of units. Further, the labels or names of the units are used only for illustrative purpose and does not limit the scope of the embodiments herein. One or more units can be combined together to perform same or substantially similar function in the authentication system 100.

Figure 2:
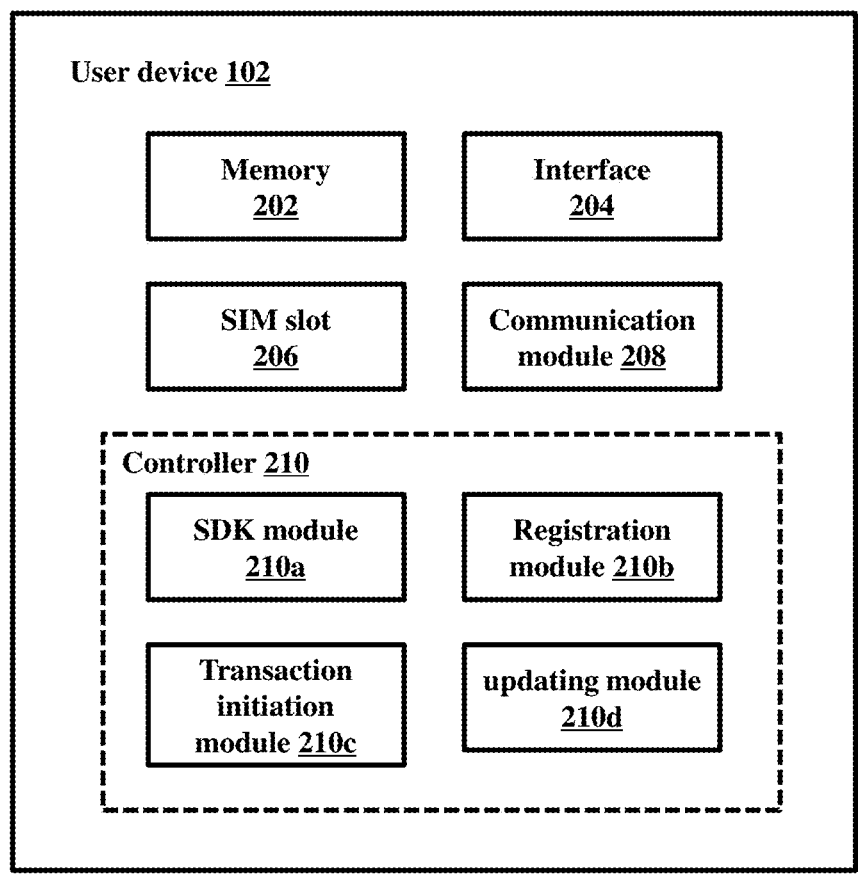
FIG. 2 is a block diagram depicting components of a user device in the authentication system, according to embodiments as disclosed herein.

FIG. 2 is a block diagram depicting components of the user 102, according to embodiments as disclosed herein. The user device 102 includes a memory 202, an interface 204, a Subscriber Identity Module (SIM) slot 206, a communication module 208, and a controller 210.

The memory 202 can store at least one of, the applications provided by the service providers, the TXIDs, the at least one user device cryptographic share, the user device mapping (that includes the mapping of the at least one user device cryptographic share with the application ID and the TXID of the application), and so on. Examples of the memory 202 may be, but are not limited to, NAND, embedded MultiMediaCard (eMMC), Secure Digital (SD) cards, Universal Serial Bus (USB), Serial Advanced Technology Attachment (SATA), solid-state drive (SSD), and so on. Further, the memory 202 may include one or more computer-readable storage media. The memory 202 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 202 may, in some examples, be considered a non-transitory storage medium. The term "non-transitory" may indicate that the storage medium is not embodied in a carrier wave or a propagated signal. However, the term "non-transitory" should not be interpreted to mean that the memory 202 is non-movable. In certain examples, a non-transitory storage medium may store data that can, over time, change (e.g., in Random Access Memory (RAM) or cache).

The interface 204 may be at least one of a display, at least one switch, a touch screen, a speaker, a microphone, a virtual keyboard, and so on. In an example herein, the display may be at least one of a Liquid Crystal Display (LCD), Organic Light Emitting Diodes (OLED) display, Light-Emitting Diode (LED) display, and so on. The interface 204 may enable the user to interact with the user device 102. The interface 204 may display the one or more crypto-objects and the associated code received from the authentication server 104 to the user and allow the user to select the one or more crypto-objects by performing the at least one gesture.

The SIM slot 206 may be configured to provide housing for one or more SIMs operated by same or different network service providers. The SIMs may support at least one communication network 108 to enable the user device 102 to communicate with the least one external device (the authentication server 104, another user device 102, the like). The communication network 108 may be, but not limited to, 3rd Generation Partnership Project (3GPP), Long Term Evolution (LTE/4G), LTE-Advanced (LTE-A), 3GPP2, Code Division Multiple Access (CDMA), Frequency Division Multiple Access (FDMA), Time Division Multiple Access (TDMA), Orthogonal Frequency Division Multiple Access (OFDMA), General packet radio service (GPRS), Enhanced Data rates for GSM Evolution (EDGE), Universal Mobile Telecommunications System (UMTS), Enhanced Voice-Data Optimized (EVDO), High Speed Packet Access (HSPA), HSPA plus (HSPA+), Evolved-UTRA (E-UTRA), 5G based wireless communication systems, 4G based wireless communication systems, and so on.

The communication module 208 may be configured to enable the user device 102 to communicate with the at least one external device using at least one of a Wireless Local Area Network (WLAN), Wireless Fidelity (Wi-Fi), Wi-Fi Direct, Bluetooth, Bluetooth Low Energy (BLE), cellular communications (2G/3G/4G/5G or the like), and so on.

The controller 210 may be at least one of a single processor, a plurality of processors, multiple homogenous cores, multiple heterogeneous cores, multiple Central Processing Unit (CPUs) of different kinds and so on. The controller 210 may be configured to perform the registration process for receiving the TXID, and the user device cryptographic share for the application, that is selected by the user. The controller 210 may also be configured to initiate the authentication process, when the user selects the at least one application for performing the transaction.

The controller 210 includes an SDK module/SDK 210a, a registration module 210b, an authentication/transaction initiation module 210c, and an updating module 210d.

The SDK module 210a may be configured to generate the device fingerprint of the user device 102. On selecting the application by the user, the SDK module 210a collects the attributes of the hardware, and the software modules of the user device 102. The SDK module 210a combines the collected attributes and applies a hashing algorithm on the collected attributes to generate a hash value, wherein the hash value corresponds to the device fingerprint.

The registration module 210b may be configured to send the generated device fingerprint to the authentication server 104 using the communication network 108.

In response to the sent device fingerprint, the registration module 210b may or may not receive the enforcement challenge request from the authentication server 104. If the enforcement challenge request is received, the registration module 210b provides the user consent to the authentication server 104. The user consent may be used by the authentication server 104 for the verification of the device number/mobile number/SIM id/OS id/application id number of the user device 102.

In response to the sent device fingerprint/user consent, the registration module 210b receives the one or more crypto-objects, and the code from the authentication server 104 in response to the sent device fingerprint. The registration module 210b displays the received the one or more crypto-objects, and the associated code to the user using the interface 204. The registration module 210b receives information from the interface 204 about the one or more crypto-objects that have been selected by the user using the code. The registration module 210b further sends the selected one or more crypto-objects to the authentication server 104. The authentication server 104 validates the user based on the received one or more crypto-objects that are selected by the user. If the user is the invalid user, the registration module 210b receives the registration failure message from the authentication server 104. If the user is the valid user, the registration module 210b receives the at least one of the plurality of cryptographic shares and the TXID from the authentication server 104 in the successful registration message. The registration module 210b creates user device mapping by including the mapping of the at least one user device cryptographic share with the application ID and the TXID of the application. The registration module 210b stores the user device mapping in the memory 202.

The authentication/transaction initiation module 210c may be configured to initiate the authentication process when the user wants to perform the transaction using the application. The authentication/transaction initiation module 210c identifies the application selected by the user for performing the transaction and extracts the TXID, and the user device cryptographic share for the selected application using the user device mapping stored in the memory 202. If the authentication/transaction initiation module 210c does not able to extract the TXID, and the user device cryptographic share for the selected application, the authentication/transaction initiation module 210c may enable the registration module 210b to perform the registration process for the corresponding selected application.

The authentication/transaction initiation module 210c sends the device fingerprint generated by the SDK module 210a, the TXID, and the user device cryptographic share to the authentication server 104. The device fingerprint, the TXID, the user device cryptographic share may be used by the authentication server 104 to authenticate the user device 102/user. The authentication/transaction initiation module 210c receives the failure authentication message from the authentication server 104 if the user is not authenticated successfully by the authentication server 104. The authentication/transaction initiation module 210c receives the successful authentication message from the authentication server 104 if the user is successfully authenticated by the authentication server 104. On receiving the successful authentication message, the authentication/transaction initiation module 210c can initiate an authorization process with a service provider device, to perform the at least one transaction (i.e., to access the at least one of the information, the services, and so on) using the selected application.

The updating module 210d may be configured to receive the newly generated user device cryptographic share, and the newly created TXID from the authentication server 104 for the selected application after each successful authentication. The updating module 210d updates the user device mapping based on the newly generated user device cryptographic share and the newly created TXID. The updating module 210d stores the updated user device mapping in the memory 202. Thus, the user device 102 may send the newly generated user device cryptographic share and the newly created TXID to the authentication server 104, when the user device 102 has to be authenticated for performing a next transaction using the same application.

FIG. 2 shows exemplary units of the user device 102, but it is to be understood that other embodiments are not limited thereon. In other embodiments, the user device 102 may include less or more number of units. Further, the labels or names of the units are used only for illustrative purpose and does not limit the scope of the embodiments herein. One or more units can be combined together to perform same or substantially similar function in the user device 102.

Figure 3:
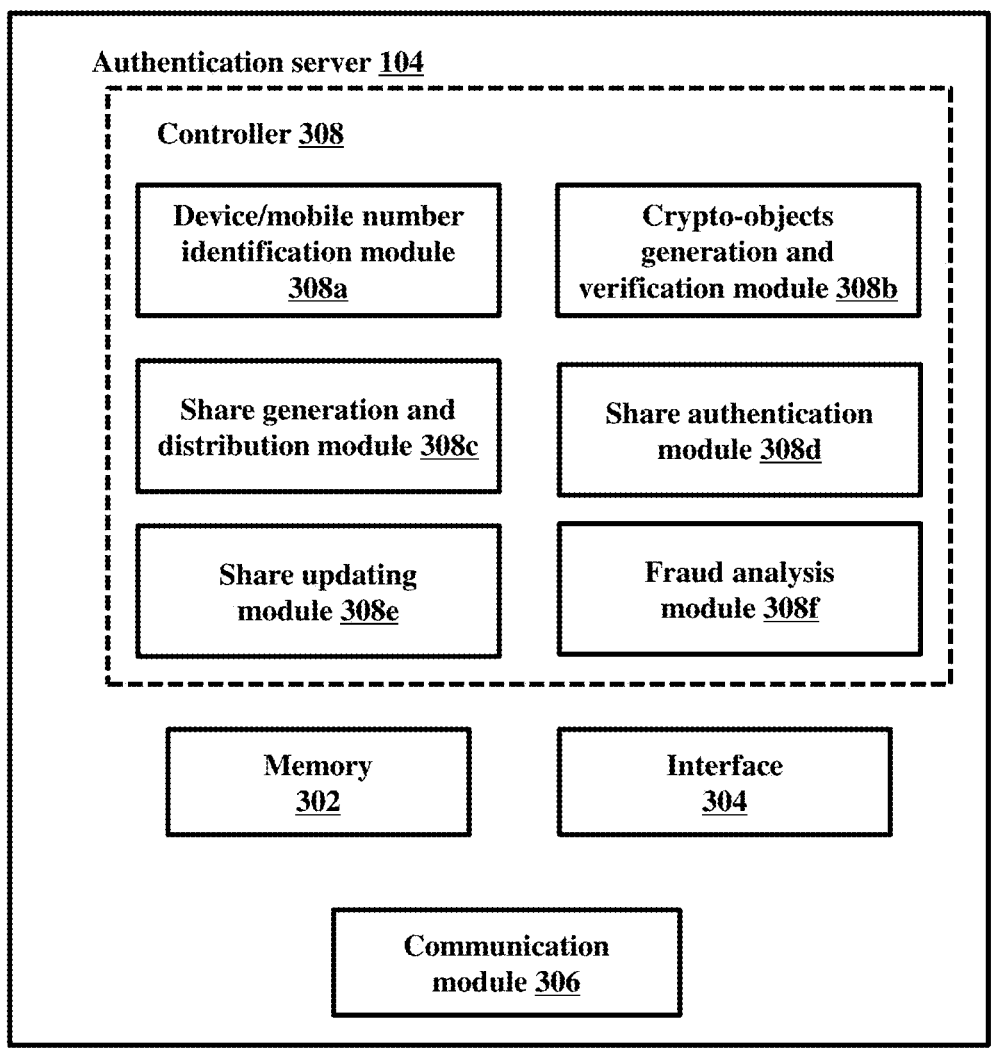
FIG. 3 is a block diagram depicting components of an authentication server in the authentication system, according to embodiments as disclosed herein.

FIG. 3 is a block diagram depicting components of the authentication server 104, according to embodiments as disclosed herein. The authentication server 104 includes a memory 302, an interface 304, a communication module 306, and a controller 308.

The memory 302 can store at least one of the one or more crypto-objects, and the associated codes, the device fingerprints of the user devices 102, the device numbers/mobile numbers of the user devices 102, the plurality of cryptographic shares generated for each application, the authentication server mapping, and so on. In an embodiment, the authentication server 104 may be coupled with at least one of, but is not limited to, a database, a file server, a cloud storage, a storage server, and so on to store at least one of the one or more crypto-objects, and the associated codes, the authentication server cryptographic shares, the authentication server mapping, and so on.

The interface 304 may be at least one of a display, at least one switch, a touch screen, a speaker, a microphone, and so on. The interface 304 may enable the user/administrator to interact with the authentication server 104.

The communication module 306 may be configured to enable the authentication server 104 to communicate with the user devices 102, the escrow server 106, and so on using the communication network 108.

The controller 308 may be at least one of a single processor, a plurality of processors, multiple homogenous cores, multiple heterogeneous cores, multiple Central Processing Unit (CPUs) of different kinds and so on. The controller 308 includes a device/mobile number identification module 308*a*, a crypto-objects generation and verification module 308*b*, a share generation and distribution module 308*c*, a share authentication module 308*d*, a share updating module 308*e*, and a fraud analysis module 308*f*. The device/mobile number identification module 308*a*, the crypto-objects generation and verification module 308*b*, and the share generation and distribution module 308*c* may be operated during the registration process initiated by the user device 102 for the application. The share authentication module 308*d*, and the share updating module 308*e* can be operated during the authentication of the user device 102.

The device/mobile number identification module 308*a* may be configured to identify the device number/mobile number/SIM id/OS id/application id number of the user device 102. For identifying the device number/mobile number/SIM id/OS id/application id number, the device/mobile number identification module 308*a* receives the device fingerprint of the user device 102. In an example, the device/mobile number identification module 308*a* may receive the device fingerprint with the MSISDN added by the communication network 108. In another example, the device/mobile number identification module 308*a* may receive the device fingerprint without any MSISDN.

If the device fingerprint is associated with the MSISDN, then the device/mobile number identification module 308*a* identifies the device number/mobile number/SIM id/OS id/application id number of the user device 102 using the MSISDN. If the device fingerprint is not associated with the MSISDN, the device/mobile number identification module 308*a* enables the user device 102 to trigger the message and receive the triggered message from the user device 102. Based on the received message from the user device 102, the device/mobile number identification module 308*a* identifies the device number/mobile number/SIM id/OS id/application id number of the user device 102.

In an embodiment, the device/mobile number identification module 308*a* may also be configured to perform the verification of the identified device number/mobile number/SIM id/OS id/application id number of the user device 102. The device/mobile number identification module 308*a* sends the enforcement challenge request to the user, which may be in the form of the crypto-image (for example). The device/mobile number identification module 308*a* receives the user consent in response to the sent enforcement challenge request. The device/mobile number identification module 308*a* uses the user consent to perform the verification of the device number/mobile number/SIM id/OS id/application id number of the user device 102.

The crypto-objects generation and verification module 308*b* may be configured to generate the one or more crypto-objects, and the associated code on identifying the device number/mobile number/SIM id/OS id/application id number of the user device 102. In an embodiment, the one or more crypto-objects may be, but are not limited to, a plurality of media objects (images, audios, videos, animations, and so on), text, a plurality of characters (for example: letters, numerals, signs, special characters, and so on), a plurality of words, vernacular options, a plurality of pin codes, user specific details (for example: date of birth, pet names, and so on), a plurality of icons, "Yes" or "No" options, and so on. The code may include a set of instructions for the user to select the one or more crypto-objects by performing at least one gesture. The crypto-objects generation and verification module 308*b* sends the generated the one or more crypto-objects, and the code to the user device 102, which allows the user to select the one or more crypto-objects by performing the at least one gesture. The crypto-objects generation and verification module 308*b* further receives the user crypto consent from the user of the user device 102, which indicates the one or more crypto-objects selected by the user in accordance with the associated code. On receiving the user crypto consent, the crypto-objects generation and verification module 308*b* validates the user of the user device 102. The crypto-objects generation and verification module 308*b* checks if the one or more crypto-objects have been selected by the user according to the instructions of the associated code. If the received one or more crypto-objects have not been selected by the user according to the instructions of the associated code, the crypto-objects generation and verification module 308*b* determines that the user is not a valid user, and sends the authentication failed message to the user device 102. If the received one or more crypto-objects have been selected by the user according to the instructions of the associated code, then the crypto-objects generation and verification module 308*b* determines that the user is a valid user.

The share generation and distribution module 308*c* may be configured to generate the plurality of cryptographic shares and distributes the generated cryptographic across the user device 102, the authentication server 104, and the escrow server 106. After performing the validation of the user and/or verification of the device number/mobile number/SIM id/OS id/application id number of the user device 102, the share generation and distribution module 308*c* generates the cryptographic shares based on at least one of, but is not limited to, the device fingerprint, the device number/mobile number/SIM id/OS id/application id number of the user device 102, the user consent received in response to the enforcement challenge request, the crypto-objects generated for the validation of the user, the identifier of the application, and so on. The share generation and distribution module 308*c* also generates the TXID for the application for which the user device 102 has initiated the registration process.

On generating the plurality of cryptographic shares, the share generation and distribution module 308*c* allocates and distributes the plurality of cryptographic shares among the user device 102, the authentication server 104 and the escrow server 106. The share generation and distribution module 308*c* allocates the one or more authentication server cryptographic shares from the generated plurality of cryptographic shares for the authentication server 104. The share generation and distribution module 308*c* also creates and stores the authentication server mapping in the associated database. The authentication server mapping includes the mapping of the at least one authentication server cryptographic share generated for the user device 102 with the device fingerprint of the user device 102, the device number/mobile number/SIM id/OS id/application id number of the user device 102, the user consent, the crypto-objects, and the application ID. The share generation and distribution module 308c also stores the plurality of cryptographic shares generated with respect to the user device 102 in the associated database.

The share generation and distribution module 308c also allocates and sends the one or more escrow server cryptographic shares from the generated plurality of cryptographic shares to the escrow server 106.

The share generation and distribution module 308c allocates and sends the one or more user device cryptographic shares from the generated plurality of cryptographic shares to the user device 102 in the successful registration message. The share generation and distribution module 308c also sends the TXID for the application to the user device 102.

The share authentication module 308d may be configured to authenticate the user/user device 102 for performing the at least one transaction using the selected application. The share authentication module 308d receives the device fingerprint, the TXID of the application, and the at least one user device cryptographic share from the user device 102 for the authentication in the authentication request. The share authentication module 308d extracts the authentication server cryptographic share for the received device fingerprint by accessing the authentication server mapping from the memory 302. The share authentication module 308d also receives the escrow server cryptographic share from the escrow server 106 for the received device fingerprint of the user device 102.

The share authentication module 308d decrypts the received at least one user device cryptographic share to obtain the device fingerprint, the device number/mobile number/SIM id/OS id/application id number, the user consent, the crypto-objects, or the like. The share authentication module 308d checks if the obtained device fingerprint, device number/mobile number/SIM id/OS id/application id number, user consent, and the crypto-objects match with the device fingerprint, device number/mobile number/SIM id/OS id/application id number, user consent, and the crypto-objects stored in the authentication server mapping. If at least one of, the obtained device fingerprint, device number/mobile number/SIM id/OS id/application id number, user consent, and the crypto-objects does not match with the device fingerprint, device number/mobile number/SIM id/OS id/application id number, user consent, and the crypto-objects stored in the authentication server mapping, the share authentication module 308d sends the authentication failure message to the user device 102.

If the obtained device fingerprint, device number/mobile number/SIM id/OS id/application id number, user consent, and the crypto-objects match with the device fingerprint, device number/mobile number/SIM id/OS id/application id number, user consent, and the crypto-objects stored in the authentication server mapping, the share authentication module 308d combines the at least one authentication server cryptographic share, the at least one user device cryptographic share, and the at least one escrow server cryptographic share. The share authentication module 308d matches the combined at least one authentication server cryptographic share, the at least one user device cryptographic share, and the at least one escrow server cryptographic share with the plurality of cryptographic shares generated for the application at the time of registration. If the combined at least one authentication server cryptographic share, the at least one user device cryptographic share, and the at least one escrow server cryptographic share does not match with the plurality of cryptographic shares, the share authentication module 308d sends the authentication failure message to the user device 102.

If the combined at least one authentication server cryptographic share, the at least one user device cryptographic share, and the at least one escrow server cryptographic share matches with the plurality of cryptographic shares, the share authentication module 308d determines that the user of the user device is an authenticated user and sends the successful authentication message to the user device 102.

The share updating module 308e can be configured to destroy the stored plurality of cryptographic shares with respect to the device fingerprint of the user device 102 and enable the share generation module 308c to generate the new cryptographic shares for the application, on successfully authenticating the user device 102 each time by the share authentication module 308d. The share updating module 308e updates the authentication server mapping based on the new cryptographic shares and stores the updated authentication server mapping in the memory 302.

The fraud analysis module 308f may be configured to perform the fraud analysis during the registration process and the authentication of the user device using the machine learning module.

FIG. 3 show exemplary units of the authentication server 104, but it is to be understood that other embodiments are not limited thereon. In other embodiments, the authentication server 104 may include less or more number of units. Further, the labels or names of the units are used only for illustrative purpose and does not limit the scope of the embodiments herein. One or more units can be combined together to perform same or substantially similar function in the authentication server 104.

Figure 4:
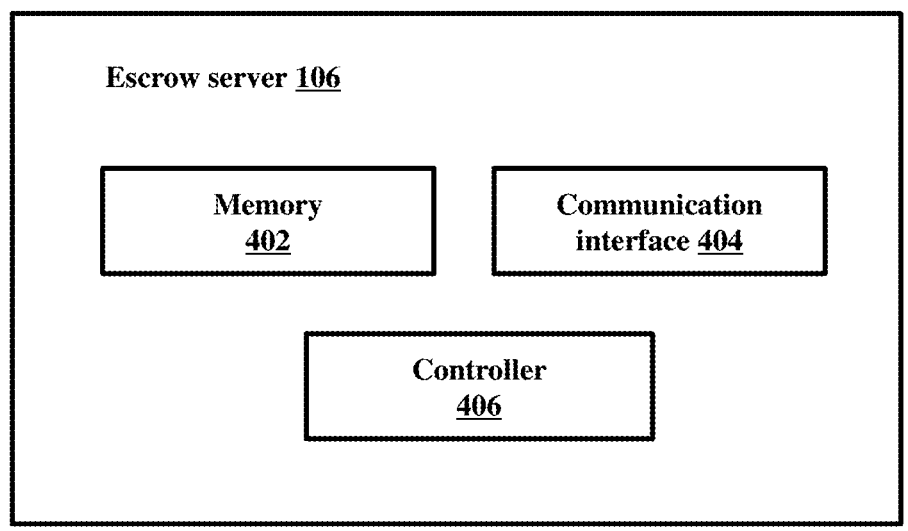
FIG. 4 is a block diagram depicting components of an escrow server in the authentication system, according to embodiments as disclosed herein.

FIG. 4 is an example block diagram depicting components of the escrow server 106, according to embodiments as disclosed herein. The escrow server 106 includes a memory 402, a communication interface 404, and a controller 406.

The memory 402 may store at least one of, the escrow server cryptographic shares, the escrow server mapping, and so on.

The communication interface 404 may be configured to enable the escrow server 106 to communicate with the authentication server 104, or the like using the communication network 108.

The controller 406 may be at least one of a single processor, a plurality of processors, multiple homogenous cores, multiple heterogeneous cores, multiple Central Processing Unit (CPUs) of different kinds and so on. During the time of registration of the application by the user device 102, the controller 406 receives the one or more escrow server cryptographic shares and the device fingerprint of the user device 102 from the authentication server 104. The controller 406 creates the escrow server mapping and stores the escrow server mapping in the memory 400. The escrow server mapping includes the mapping of the one or more escrow server cryptographic shares with the device fingerprint of the user device 102.

During the time of authentication of the user/user device 102, the controller 406 may receive a request from the authentication server 104 for the one or more escrow server cryptographic shares. The request may include the device fingerprint of the user device 102. The controller 406 fetches the one or more escrow server cryptographic shares for the received device fingerprint of the user device 102 using the escrow server mapping and sends the one or more escrow server cryptographic shares to the authentication server 104.

FIG. 4 show exemplary units of the escrow server 106, but it is to be understood that other embodiments are not limited thereon. In other embodiments, the escrow server 106 may include less or more number of units. Further, the labels or names of the units are used only for illustrative purpose and does not limit the scope of the embodiments herein. One or more units can be combined together to perform same or substantially similar function in the escrow server 106.

Figure 5:
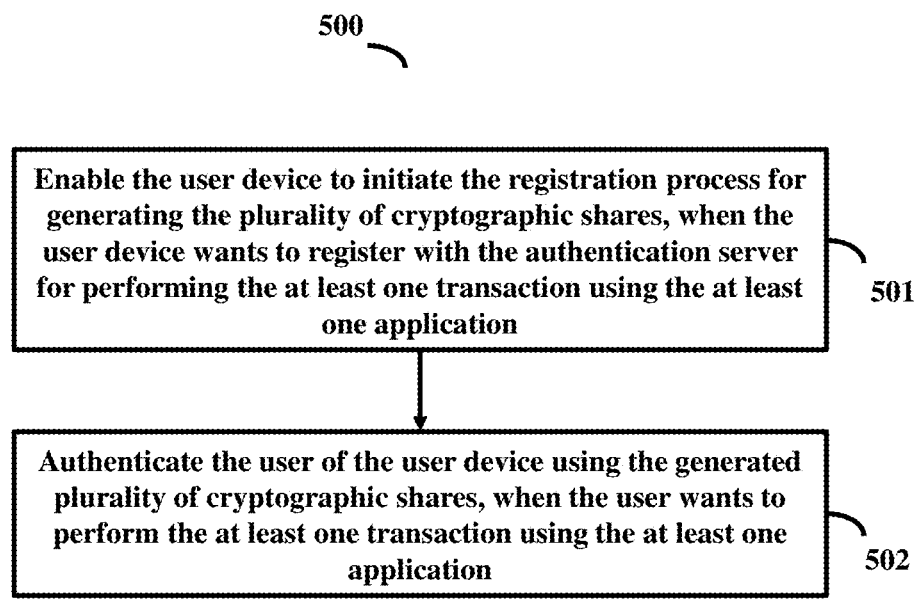
FIG. 5 depicts a flow diagram depicting a method for authenticating the user, according to embodiments as disclosed herein.

FIG. 5 depicts a flow diagram 500 depicting a method for authenticating the user, according to embodiments as disclosed herein.

At step 501, the authentication server 104 enables the user device 102 to initiate the registration process for generating the plurality of cryptographic shares, when the user device 102 wants to register with the authentication server 104 for performing the at least one transaction using the at least one application. The plurality of cryptographic shares can be generated by validating the user of the user device 102. The user can be validated by generating the plurality of crypto-objects and analyzing the user crypto consent received from the user related to the generated plurality of crypto-objects. Thus, the registration process can be performed using a single input/user consent received from the user device.

At step 502, the authentication server 104 authenticates the user of the user device 102 using the generated plurality of cryptographic shares, when the user wants to perform the at least one transaction using the at least one application. The authentication process involves authenticating the user based on static or dynamically generated cryptographic shares during the registration process and subsequent authentication processes. Thus, the authentication process can be performed without receiving any inputs from the user of the user device 102. The various actions in method 500 may be performed in the order presented, in a different order or simultaneously. Further, in some embodiments, some actions listed in FIG. 5 may be omitted.

Figure 6A:
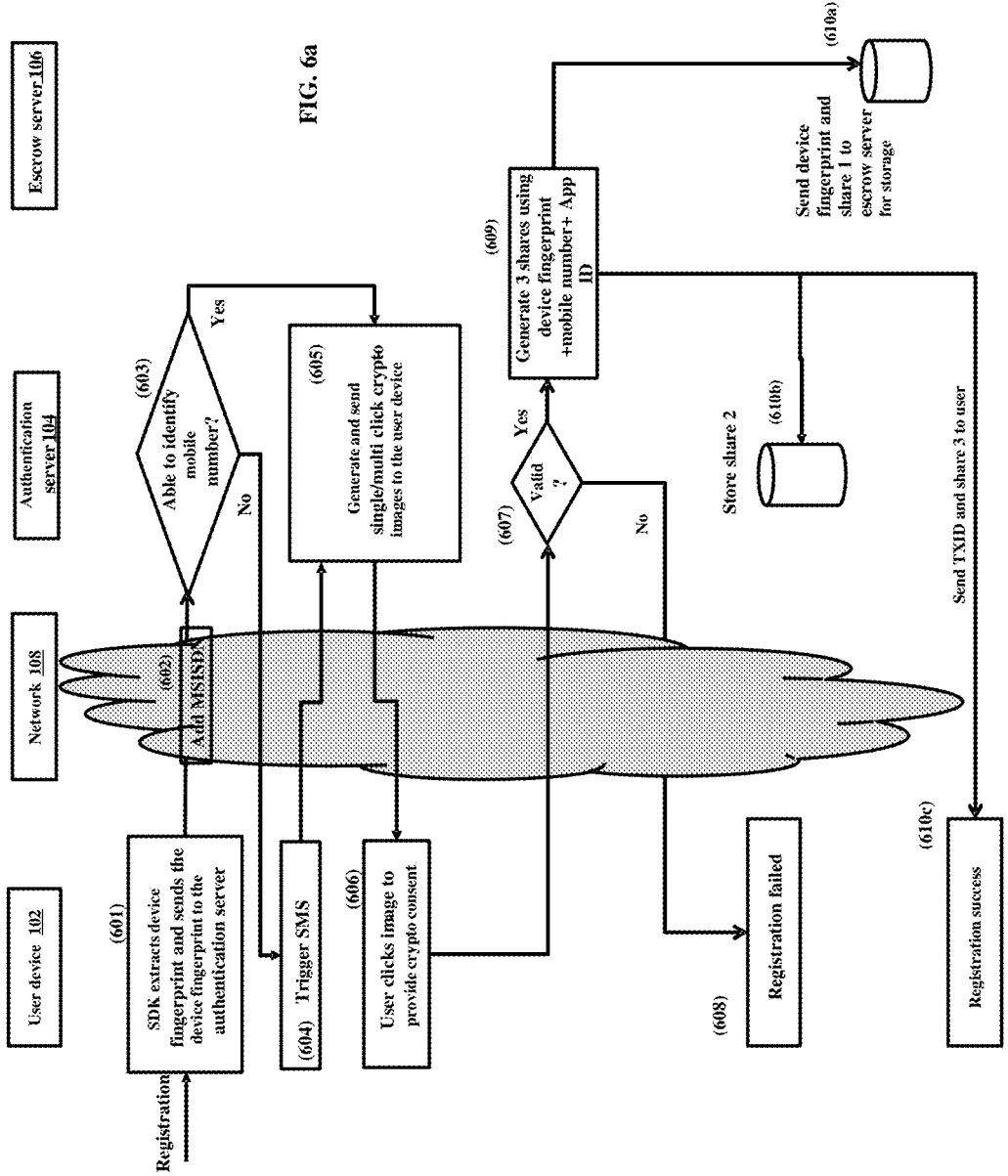
FIG. 6a is an example diagram depicting one click registration process, according to embodiments as disclosed herein.
Figure 6B:
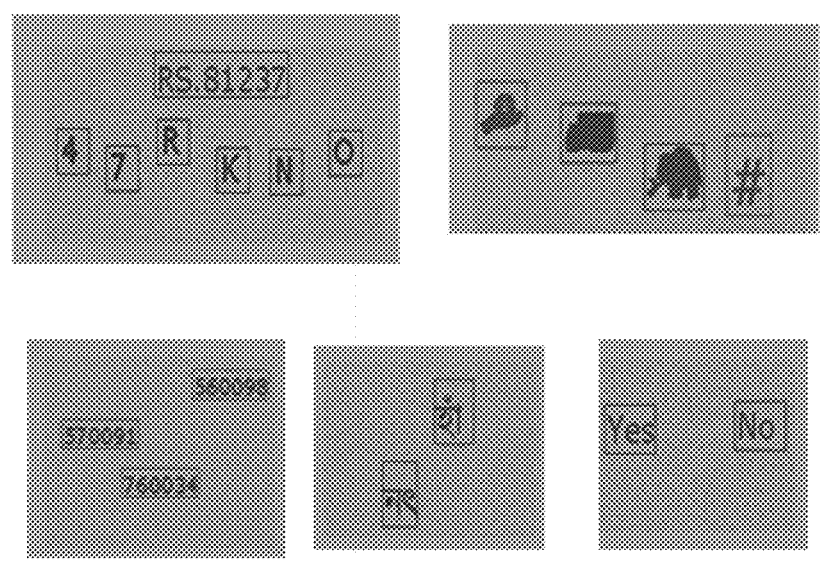
FIG. 6b depicts cryptographic objects generated for validation of a user of the user device, according to embodiments as disclosed herein.

FIGS. 6a and 6b are example diagrams depicting one click registration process, according to embodiments as disclosed herein.

As depicted in FIG. 6a, at step 601, the user device 102 initiates a sending of a registration request to the authentication server 104 through the communication network 108, when the user wants to execute the at least one application to perform the at least one transaction. The registration request includes the device fingerprint of the user device 102 extracted using the SDK provided by the authentication server 104.

At step 602, the communication network 108 forwards the device fingerprint of the user device 102 to the authentication server 104 by adding or without adding the MSISDN for the device fingerprint of the user device 102.

At step 603, the authentication server 104 identifies the device number/mobile number/SIM id/OS id/application id number of the user device 102, on receiving the device fingerprint of the user device 102. If the received device fingerprint of the user device 102 associates with the MSISDN, the authentication server 104 identifies the device number/device number of the user device 102 using the MSISDN.

If the received device fingerprint of the user device 102 does not associate with the MSISDN, at step 604, the authentication server 104 enables the SDK present on the user device 102 to trigger the message for the authentication server 104. The user device 102 sends the triggered message to the authentication server 104. The authentication server 104 identifies the device number/mobile number/SIM id/OS id/application id number of the user device 102 using the received message.

On identifying the device number/mobile number/SIM id/OS id/application id number of the user device 102, at step 605, the authentication server 104 generates the crypto-objects for the user device 102. In an example herein, consider that the crypto-objects may include single or multi-click cryptographic images. FIG. 6b depicts examples of the cryptographic images, according to embodiments as disclosed herein. The cryptographic images may include a plurality of letters, a plurality of pin codes, "Yes" or "No" options, a plurality of images, vernacular options, and so on, as depicted in FIG. 6b. The authentication server 104 further creates the code for the generated cryptographic images. The code can depict the instructions to select the cryptographic images by performing a single click or multiple clicks. Consider an example scenario, wherein a plurality of characters (for example: 4, 7, R, K, N, O) with an amount and the code have been sent to the user. In an example, the code may indicate the user to select two letters, and one numeral by performing multiple gestures (for example: clicks). In accordance with the code, the user has to perform the multiple clicks to select the two letters, and the numeral.

As depicted in FIG. 6a, at step 606, the user device 102 clicks on the cryptographic images to provide the user crypto consent to the authentication server 104. At step 607, the authentication server 104 validates the user of the user device 102 based on the user crypto consent. If the user is not validated successfully, at step 608, the authentication server 104 sends the registration failure message to the user device 102.

If the user is validated successfully, at step 609, the authentication server 104 generates/creates the plurality of cryptographic shares for the user device 102 for the specific application. In an example herein, consider that the authentication server 104 generates three cryptographic shares (a share 1, a share 2, and a share 3) based on the device fingerprint of the user device 102, the device number/mobile number/SIM id/OS id/application id number of the user device 102, and the application ID. The authentication server 104 also generates the TXID of the application for the user device 102.

At step 610a, the authentication server 104 sends the share 1 to the escrow server 106 for secure storage. At step 610b, the authentication server 104 stores the share 2 in the associated database. At step 610c, the authentication server 104 sends the share 3 and the TXID of the application to the user device 102 for the storage and sends the registration successful message to the user device 102.

Figure 7:
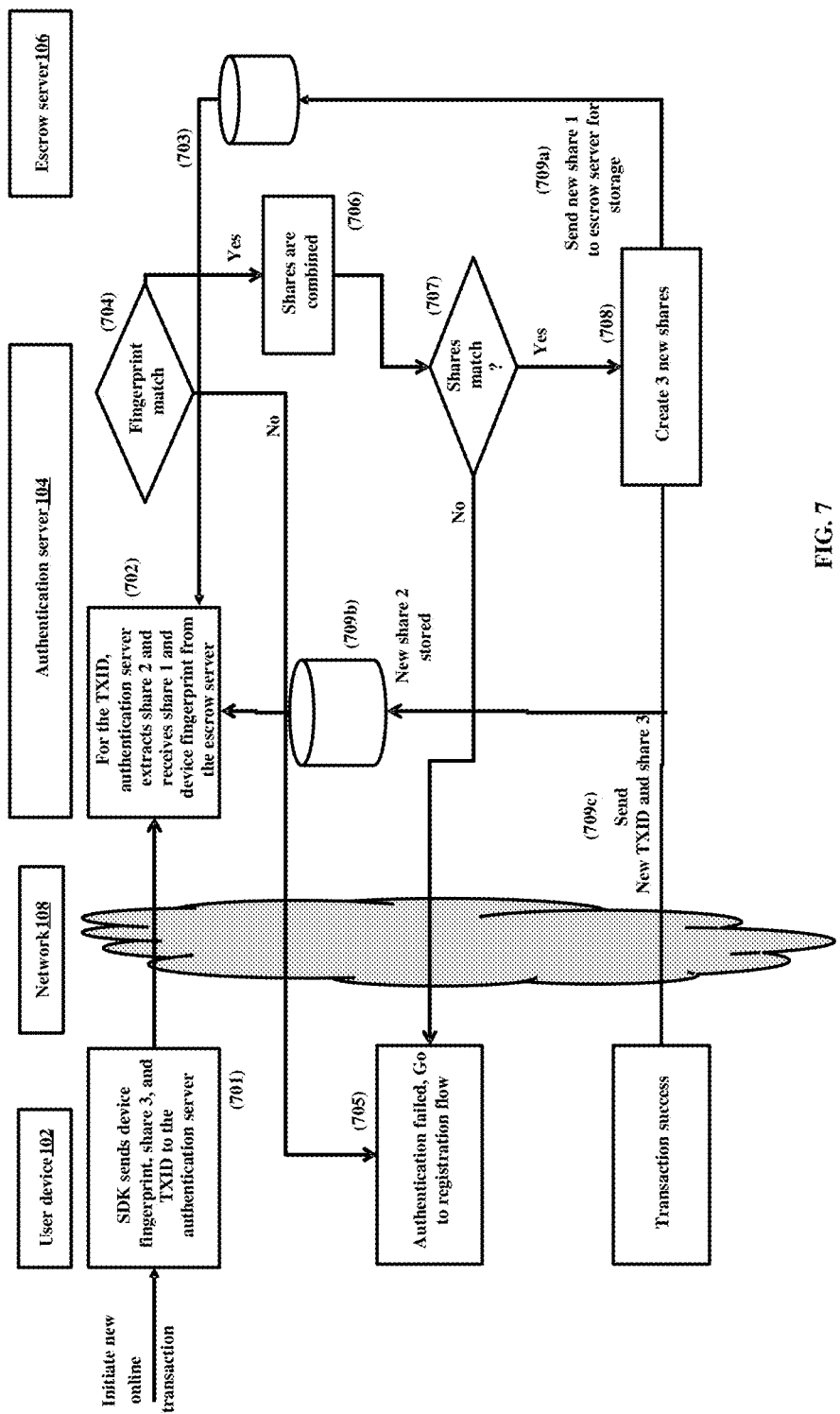
FIG. 7 is an example flow diagram depicting the clickless authentication, according to embodiments as disclosed herein.

FIG. 7 is an example flow diagram depicting the clickless authentication, according to embodiments as disclosed herein.

At step 701, the user device 102 sends an authentication request to the authentication server 104 through the communication network 108 for the authentication, when the user wants to perform the at least one transaction using the at least one application for which the registration is successful. The authentication request includes the device fingerprint of the user device 102, the TXID of the application and the share 3 (that is the share received from the authentication server 104 during the registration process or the previous authentication process).

On receiving the authentication request, at step 702, the authentication server 104 extracts the share 2 from the associated database (that is the share already stored for the device fingerprint of the user device 102) for the received device fingerprint of the user device 102. At step 703, the authentication server 104 receives the share 1 from the escrow server 106 for the received device fingerprint of the user device.

On receiving/extracting the share 1, the share 2, and the share 3, at step 704, the authentication server 104 performs a validation of the received device fingerprint of the user device 102. The authentication server 104 checks if the received device fingerprint of the user device 102 matches with the stored device fingerprint of the user device 102. If the received device fingerprint of the user device 102 matches with the stored device fingerprint of the user device 102, the authentication server 104 determines that the received device fingerprint of the user device 102 is valid. If the received device fingerprint of the user device 102 does not match with the stored device fingerprint of the user device 102, the authentication server 104 determines that the received device fingerprint of the user device 102 is invalid.

On determining that the received device fingerprint of the user device 102 is invalid, at step 705, the authentication server 104 sends an authentication failed message to the user device 102.

On determining that the received device fingerprint of the user device 102 is valid, at step 706, the authentication server 104 combines the share 1, the share 2 and the share 3. At step 707, the authentication server 104 checks if the combined shares match with the three shares generated for the user device 102 during the registration process or the previous authentication process.

If the combined shares do not match with the three shares generated for the user device 102 during the registration process or the previous authentication process, the authentication server 104 repeats the step 705 to send the authentication failed message to the user device 102.

If the combined shares match with the three shares generated for the user device 102 during the registration process, at step 708, the authentication server 104 generates three new cryptographic shares (a new share 1, a new share 2, and a new share 3) as an example for the user device 102. On generating the new shares, at step 709a, the authentication server 104 shares the new share 1 generated for the user device 102 with the escrow server 106 for storage. At step 709b, the authentication server 104 stores the new share 2 generated for the user device 102 in the associated database. At step 709c, the authentication server 104 shares the new share 3 to the user device 102 and sends the authentication success message/transaction successful message to the user device 102.

Figure 8A:
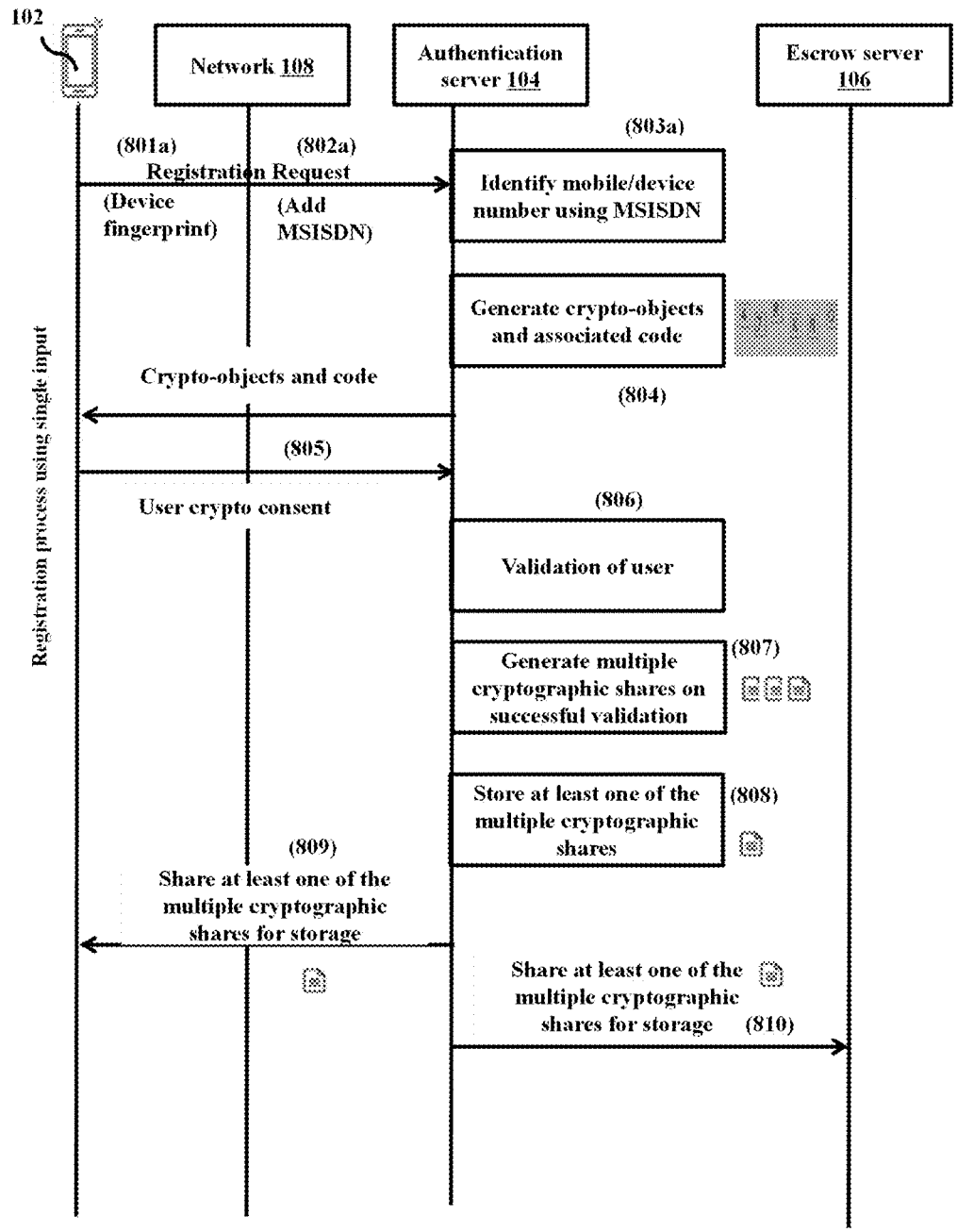
FIGS. 8a and 8b are example sequence diagrams depicting the registration process performed over different communication networks, according to embodiments as disclosed herein.
Figure 8B:
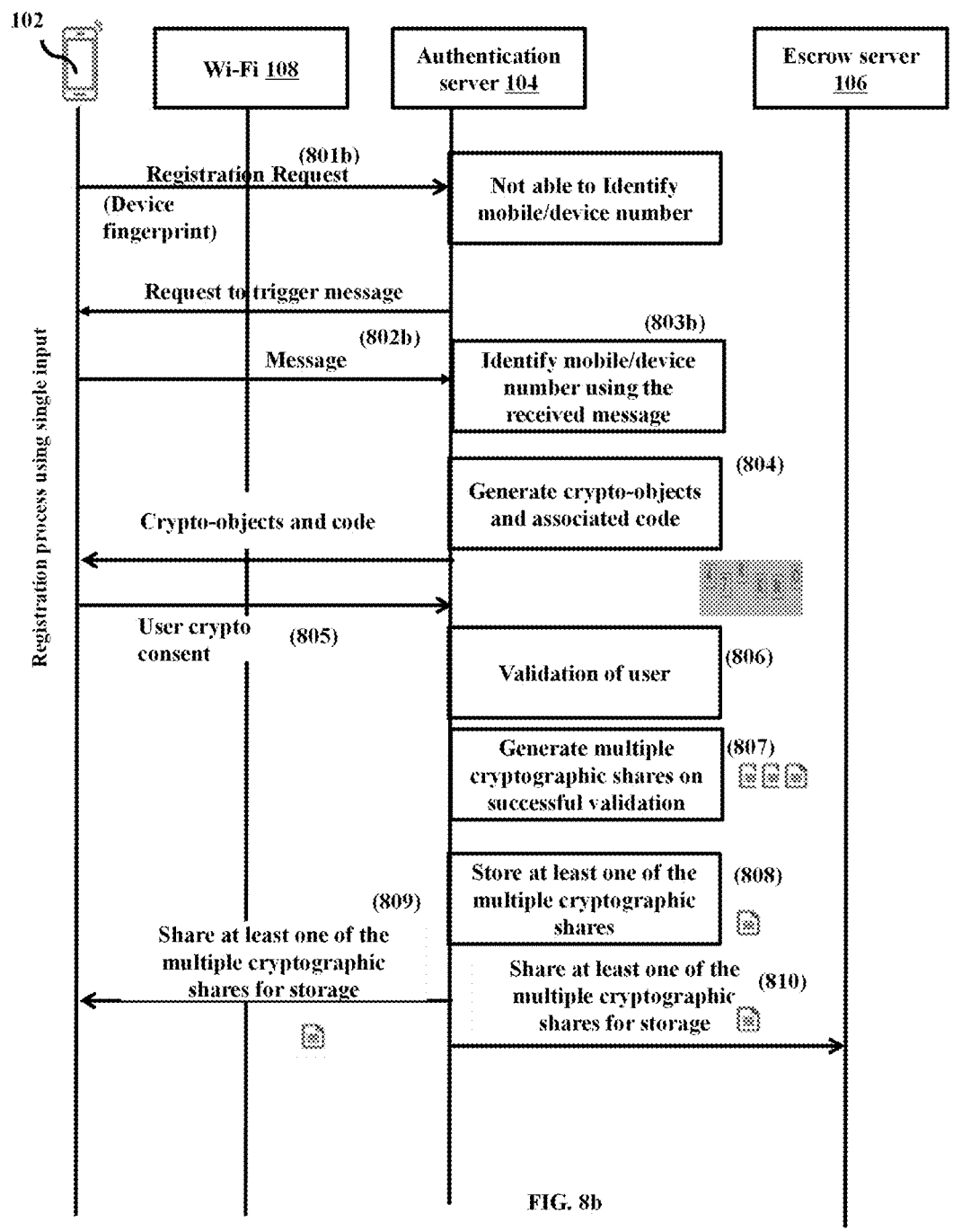

FIGS. 8a and 8b are example sequence diagrams depicting the registration process performed over different communication networks 108, according to embodiments as disclosed herein.

Consider an example scenario as depicted in FIG. 8a, wherein the communication network 108 is a cellular network 108. In such a scenario, at step 801a, the user device 102 sends the device fingerprint to the cellular network 108 to forward the device fingerprint to the authentication server 104, when the user of the user device 102 wants to register the application with the authentication server 104. The registered application can be used for performing the at least one transaction. At step 802a, the cellular network 108 adds the MSISDN of the user device 102 to the device fingerprint and sends the device fingerprint with the MSISDN of the user device 102 to the authentication server 104.

At step 803a, the authentication server 104 identifies the device number/mobile number/SIM id/OS id/application id number of the user device 102 based on the received MSISDN. On identifying the device number/mobile number/SIM id/OS id/application id number of the user device 102, at step 804, the authentication server 104 generates the crypto-objects and sends the crypto-objects to the user device 102. At step 805, the user device 102 allows the user to click on the crypto-objects and sends the user crypto consent to the authentication server 104.

At step 806, the authentication server 104 validates the user of the user device 102 based on the user crypto consent. If the user is a valid user, at step 807, the authentication server 104 generates the plurality of crypto-objects. At step 808, the authentication server 104 stores at least one of the plurality of crypto-objects in the associated database as the at least one authentication server cryptographic share. At step 809, the authentication server 104 shares at least one of the plurality of the cryptographic shares with the user device cryptographic share as the user device cryptographic share for storage. At step 810, the authentication server 104 shares at least one of the plurality of the cryptographic shares with the escrow server 106 as the escrow server cryptographic share for storage.

Consider another example scenario as depicted in FIG. 8b, wherein the communication network 108 is a Wi-Fi network. In such a scenario, at step 801b, the user device 102 sends the device fingerprint the authentication server 104 through the Wi-Fi network 108, when the user of the user device 102 wants to register the application with the authentication server 104. The registered application can be used for performing the at least one transaction. The Wi-Fi network 108 does not add the MSISDN of the user device 102 to the device fingerprint.

On receiving the device fingerprint without the MSISDN, at step 802b, the authentication server 104 enables the user device 102 to trigger the message. The user device 102 generates the message, on receiving the trigger for the message from the authentication server 104 and sends the message to the authentication server 104. At step 803b, the user device 102 identifies the device number/mobile number/SIM id/OS id/application id number of the user device 102 based on the received message. On identifying the device number/mobile number/SIM id/OS id/application id number of the user device 102, the authentication server 104 performs the steps 804-810, as depicted in FIG. 8a.

Figure 9:
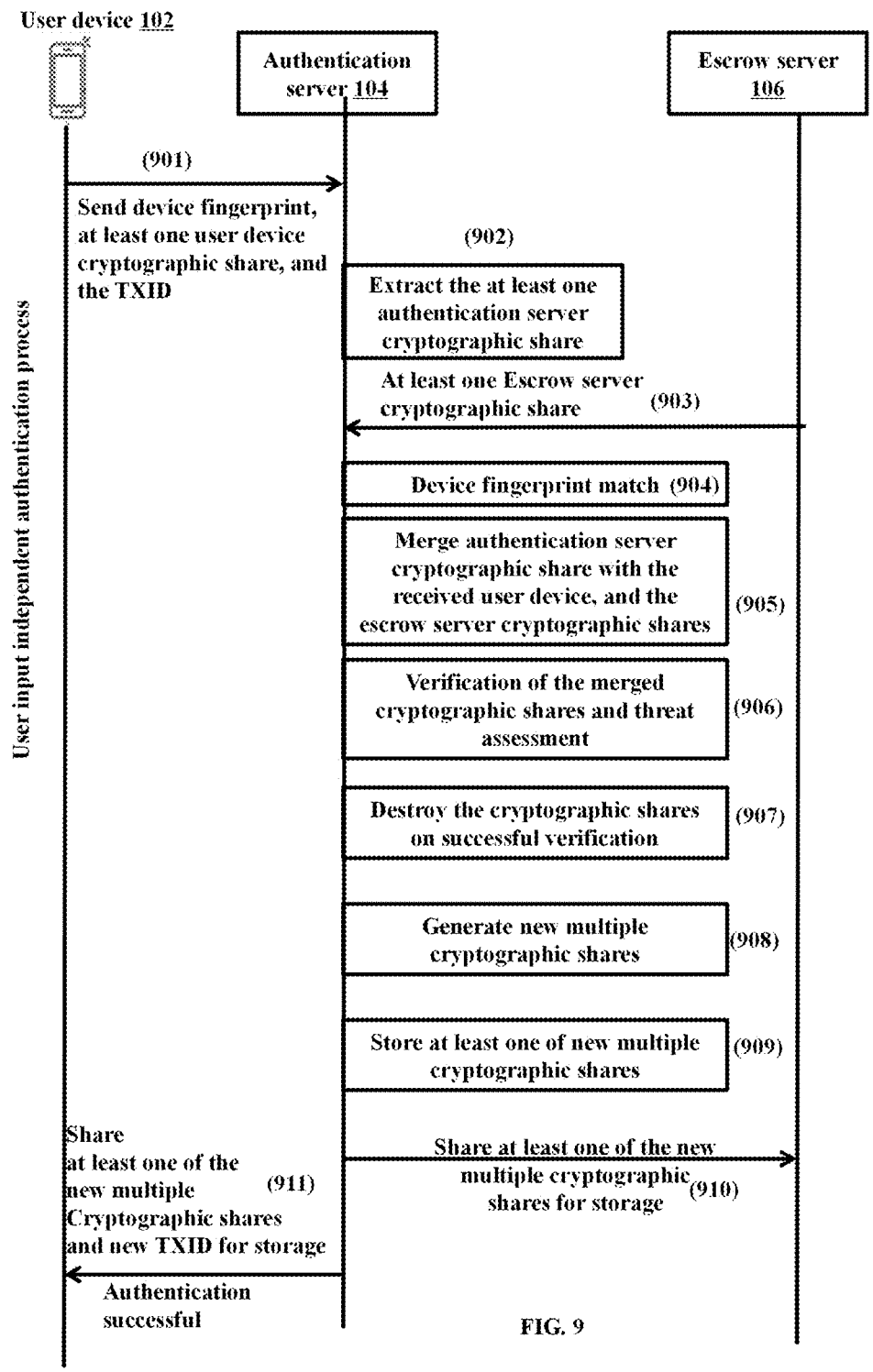
FIG. 9 is an example sequence diagram depicting the clickless authentication of the user, according to embodiments as disclosed herein.

FIG. 9 is an example sequence diagram depicting the clickless authentication of the user, according to embodiments as disclosed herein.

At step 901, the user device 102 sends an authentication request to the authentication server 104 for performing the authentication of the user, when the user wants to perform the at least one transaction using the registered at least one application.

On receiving the authentication request, at step 902, the authentication server 104 extracts the at least one authentication server cryptographic share from the associated database for the received device fingerprint of the user device 102. At step 903, the authentication server 104 requests the escrow server 106 and receives the at least one escrow server cryptographic share for the received device fingerprint of the user device 102.

At step 904, the authentication server 104 checks if the device fingerprint of the user device 102 matches with the stored device fingerprint of the user device 102. If the device fingerprint of the user device 102 matches with the stored device fingerprint of the user device 102, at step 905, the authentication server 104 combines/merges the at least one authentication server cryptographic share with the user device cryptographic share and the escrow server cryptographic share. At step 906, the authentication server 104 performs a validation by checking if the combined cryptographic shares match with the plurality of shares generated for the received device fingerprint of the user device 102. If the combined cryptographic shares match with the plurality of cryptographic shares, the authentication server 104 determines that the user is the authenticated user to perform the at least one transaction using the registered application. In an embodiment, at the time of authentication, the authentication server 104 may provide another set of crypto-objects to the user device 102 to be displayed to the user and receive the user crypto consent from the user device 102. The authentication server 104 explicitly uses the received user crypto consent to authenticate the user.

On determining that the user is the authenticated user, at step 907, the authentication server 104 destroys the plurality of cryptographic shares. At step 908, the authentication server 104 generates the new cryptographic shares and the TXID for the user device 102. At step 909, the authentication server 104 stores at least one of the new cryptographic shares in the associated database, as the at least one authentication server cryptographic share. At step 910, the authentication server 104 shares at least one of the new cryptographic shares with the escrow server 106 as the at least one escrow server cryptographic share for storage. At step 911, the authentication server 104 shares at least one of the new cryptographic shares with user device 102 as the user device cryptographic share and the new TXID with the user device 102 for storage. The new cryptographic shares can be used for authenticating the user when the user wants to perform the at least one subsequent transaction.

Figure 10A:
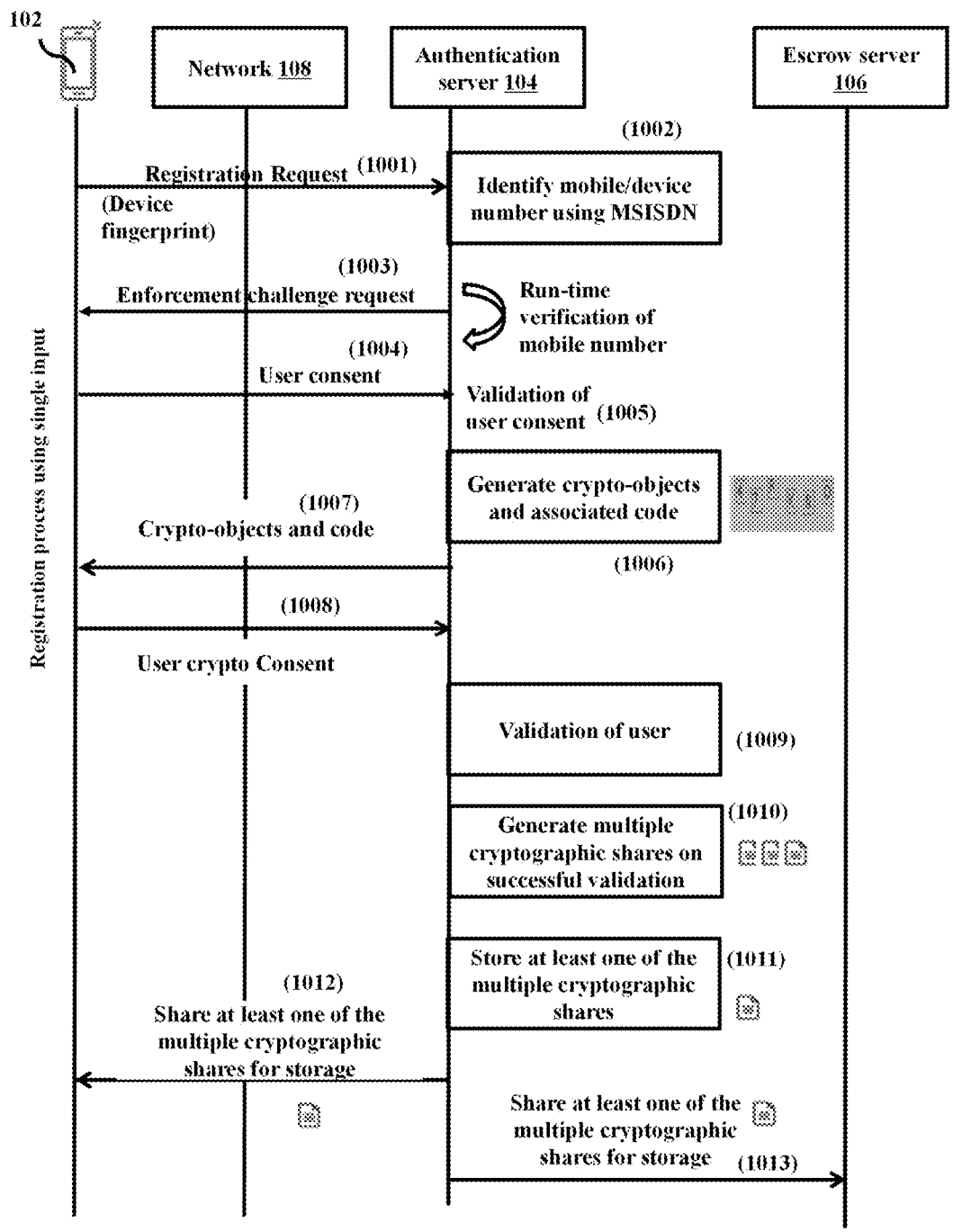
FIG. 10a is an example sequence diagram depicting the registration process based on a user consent received in an enforcement challenge request, according to embodiments as disclosed herein.

FIG. 10a is an example sequence diagram depicting the registration process based on the user consent received in the enforcement challenge request, according to embodiments as disclosed herein.

At step 1001, the user device 102 sends the registration request to the authentication server 104 for registering the at least one application. The registration request includes the device fingerprint of the user device 102. At step 1002, the authentication server 104 identifies the device number/mobile number/SIM id/OS id/application id number of the user device 102 based on the received device fingerprint.

Figure 10B:
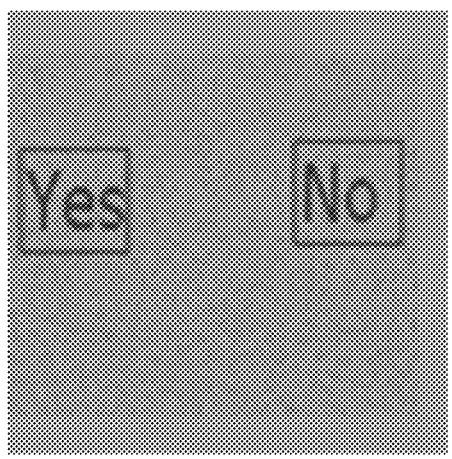
FIG. 10b depicts an enforcement challenge request, according to embodiments as disclosed herein.

On identifying the device number/mobile number/SIM id/OS id/application id number, at step 1003, the authentication server 104 sends the enforcement challenge request to the user device 102 for run-time verification of the identified device number/mobile number/SIM id/OS id/application id number. The enforcement challenge may be in a form of the crypto-image including the Yes and No options, as depicted in FIG. 10b. At step 1004, the user device 102 sends the user consent to the authentication server 104, which includes the Yes or No option that has been selected by the user. At step 1005, the authentication server 104 validates the user consent to verify the identified device number/mobile number/SIM id/OS id/application id number of the user device 102.

At step 1006, the authentication server 104 generates the crypto-objects for the user device 102 and creates the code for the generated cryptographic images. At step 1007, the authentication server 104 sends the generated crypto-objects and the associated code to the user device 102. At step 1008, the user device 102 clicks on the cryptographic objects in accordance with the code to provide the user crypto consent to the authentication server 104. At step 1009, the authentication server 104 validates the user of the user device 102 based on the user crypto consent. If the user is not validated successfully, the authentication server 104 sends the registration failure message to the user device 102.

If the user is validated successfully, at step 1010 the authentication server 104 generates/creates the plurality of cryptographic shares for the user device 102 for the specific application based on the device fingerprint of the user device 102, the device number/mobile number/SIM id/OS id/application id number of the user device 102, the user consent received from the user in response to the enforcement challenge request, and the crypto-objects generated for the validation of the user. In an example herein, consider that the authentication server 104 generates three cryptographic shares (a share 1, a share 2, and a share 3). The authentication server 104 also generates the TXID of the application for the user device 102.

At step 1011, the authentication server 104 stores the share 1 in the associated database. At step 1012, the authentication server 104 sends the share 2 and the TXID of the application to the user device 102 for the storage and sends the registration successful message to the user device 102. At step 1013, the authentication server 104 sends the share 3 to the escrow server 106 for secure storage with respect to the device fingerprint of the user device 102.

Figure 11:
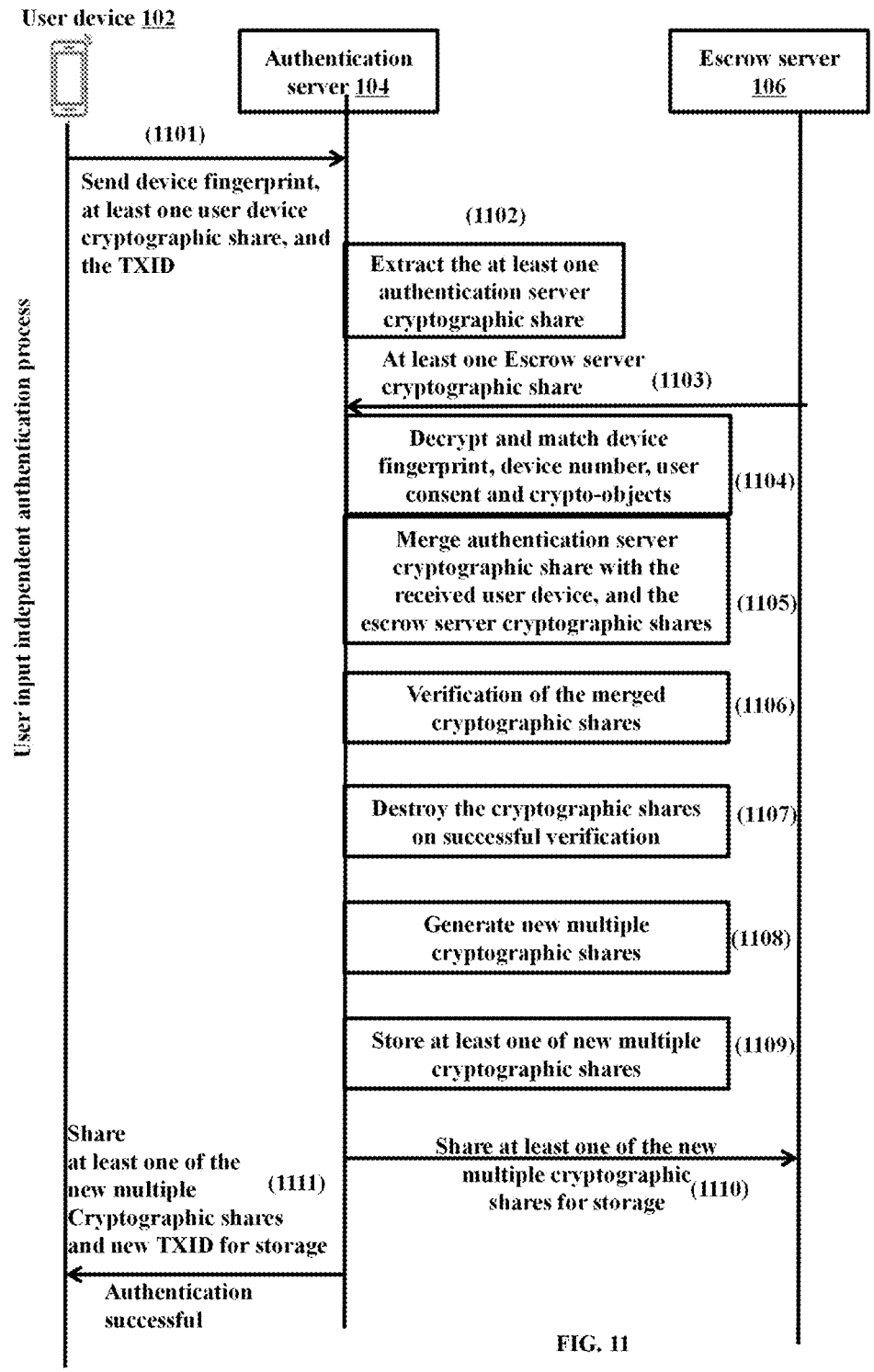
FIG. 11 is an example diagram depicting authentication of the user based on the user consent received in the enforcement challenge request during the registration process, according to embodiments as disclosed herein.

FIG. 11 is an example diagram depicting authentication of the user based on the user consent received in the enforcement challenge request during the registration process, according to embodiments as disclosed herein.

At step 1101, the user device 102 sends the authentication request to the authentication server 104 for performing the authentication of the user, when the user wants to perform the at least one transaction using the registered at least one application. The authentication request includes the at least one user device cryptographic share (for example, the share 2), the device fingerprint of the user device, the TXID, or the like.

On receiving the authentication request, at step 1102, the authentication server 104 extracts the at least one authentication server cryptographic share (for example, the share 1) from the associated database for the received device fingerprint of the user device 102. At step 1103, the authentication server 104 requests the escrow server 106 and receives the at least one escrow server cryptographic share (for example, the share 3) for the received device fingerprint of the user device 102.

At step 1104, the authentication server 104 decrypts the authentication request/share 1 to obtain the device fingerprint, the device number/mobile number/SIM id/OS id/application id number, the user consent (provided in response to the enforcement challenge request), and the crypto-objects. The authentication server 104 checks if the obtained device fingerprint, device number/mobile number/SIM id/OS id/application id number, user consent and crypto-objects match with the device fingerprint, the device number/mobile number/SIM id/OS id/application id number, the user consent, and the crypto-objects stored in the authentication server mapping. If at least one of, the obtained device fingerprint, device number/mobile number/SIM id/OS id/application id number, user consent and crypto-objects does not match with the device fingerprint, the device number/mobile number/SIM id/OS id/application id number, the user consent, and the crypto-objects stored in the authentication server mapping, the authentication server 104 sends the authentication failure message to the user device 102. If the obtained device fingerprint, device number/mobile number/SIM id/OS id/application id number, user consent and crypto-objects match with the device fingerprint, the device number/mobile number/SIM id/OS id/application id number, the user consent, and the crypto-objects stored in the authentication server mapping, at step 1105, the authentication server 104 merges the share 1, the share 2, and the share 3. At step 1106, the authentication server 104 performs a validation by checking if the combined cryptographic shares match with the plurality of shares generated for the received device fingerprint of the user device 102. If the combined cryptographic shares match with the plurality of cryptographic shares, the authentication server 104 determines that the user is the authenticated user to perform the at least one transaction using the registered application.

On determining that the user is the authenticated user, at step 1107, the authentication server 104 destroys the plurality of cryptographic shares. At step 1108, the authentication server 104 generates the new cryptographic shares and the TXID for the user device 102. At step 1109, the authentication server 104 stores at least one of the new cryptographic shares in the associated database, as the at least one authentication server cryptographic share. At step 1110, the authentication server 104 shares at least one of the new cryptographic shares with the escrow server 106 as the at least one escrow server cryptographic share for storage. At step 1111, the authentication server 104 shares at least one of the new cryptographic shares with user device 102 as the user device cryptographic share and the new TXID with the user device 102 for storage. The new cryptographic shares can be used for authenticating the user when the user wants to perform the at least one subsequent transaction.

The embodiments disclosed herein can be implemented through at least one software program running on at least one hardware device and performing network management functions to control the elements. The elements shown in FIGS. 1, 2, 3, and 4 can be at least one of a hardware device, or a combination of hardware device and software module.

The embodiments disclosed herein describe methods and systems for performing clickless authentication. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

I claim:

1. A method for authenticating a user of a user device (102), the method comprising:
generating, by an authentication server (104), a plurality of cryptographic shares, on receiving a registration request from the user device (102) to register at least one application; and
authenticating, by the authentication server (104), the user of the user device (102) based on the generated plurality of cryptographic shares to perform at least one transaction using the at least one application, on receiving an authentication request from the user device (102), wherein authenticating, by the authentication server (104), the user of the user device (102) includes:
receiving the device fingerprint, the TXID, and the at least one user device cryptographic share from the user device (102) in the authentication request;
decrypting the at least one user device cryptographic share to obtain at least one of, the device fingerprint of the user device (102), the device number of the user device (102), the user consent, and the at least one crypto-object;
matching the obtained at least one of, device fingerprint of the user device (102), device number of the user device (102), user consent, and at least one crypto-object match with the device fingerprint of the user device (102), the device number of the user device (102), the user consent, and the at least one crypto-object stored in the authentication server mapping;
extracting the at least one authentication server cryptographic share for the received device fingerprint of the user device (102) using the maintained authentication server mapping, if the obtained at least one of, device fingerprint of the user device (102), device number of the user device (102), user consent, and at least one crypto-object match with the device fingerprint of the user device (102), the device number of the user device (102), the user consent, and the at least one crypto-object stored in the authentication server mapping;
receiving the at least one escrow server cryptographic share for the received device fingerprint of the user device (102) using the maintained escrow server mapping; and
authenticating, by the authentication server (104), the user of the user device (102) using the at least one user device cryptographic share, the authentication server cryptographic share, and the at least one escrow server cryptographic share.

2. The method of claim 1, wherein generating, by the authentication server (104), the plurality of cryptographic shares includes;
receiving a device fingerprint from the user device (102) in the registration request;
identifying a device number of the user device (102) based on the received device fingerprint;
wherein the device number includes one of, a device identifier, or a mobile number a subscriber identity module (SIM) identifier, an operating system id (OS) and an application id, of the user device (102);
validating the user of the user device (102) using at least one cryptographic object (crypto-object), on identifying the device number of the user device (102); and generating the plurality of cryptographic shares using the received device fingerprint, and the device number of the user device (102), after validating the user successfully.

3. The method of claim 2, wherein identifying, by the authentication server (104), the device number of the user device (102) includes:
   checking if the device fingerprint of the user device (102) includes a Mobile Station International Subscriber Directory Number (MSISDN), wherein the MSISDN is added by a communication network (108) to the device fingerprint of the user device (102); and
   identifying the device number of the user device (102) based on the MSISDN, if the MSISDN is included in the device fingerprint of the user device (102).

4. The method of claim 3, further comprising:
   triggering the user device (102) to generate a message, if the device fingerprint of the user device (102) does not include the MSISDN;
   receiving the triggered message from the user device (102); and
   identifying the device number of the user device (102) based on the received message.

5. The method of claim 2, further comprising:
   sending, by the authentication server (104), an enforcement challenge request to the user device (102) on identifying the device number of the user device (102), wherein the enforcement challenge request is a crypto-image;
   receiving, by the authentication server (104), a user consent from the user device (102), wherein the user consent indicates a user response to the enforcement challenge request; and
   verifying, by the authentication server (104), the identified device number of the user device (102) by validating the user consent.

6. The method of claim 2, wherein validating, by authentication server (104), the user of the user device (102) includes:
   generating the at least one crypto-object and at least one code for the at least one cryptographic object;
   sending the generated at least one crypto-object and the at least one code to the user device (102) to be displayed to the associated user, wherein the user selects the at least one crypto-object according to the associated at least one code;
   receiving the at least one crypto-object selected by the user from the user device (102); and
   determining that the user is a valid user if the at least one crypto-object selected by the user is in consistent with the associated at least one code.

7. The method of claim 6, further comprising:
   determining that the user is an invalid user if the at least one crypto-object selected by the user is not in consistent with the associated at least one code; and
   sending a registration failure message to the user device (102), on determining that the user is the invalid user.

8. The method of claim 6, wherein the at least one crypto-object includes at least one of a plurality of characters, a plurality of media objects, a plurality of vernacular options, single choice selectable options, a plurality of pin codes, and user specific details.

9. The method of claim 6, wherein the at least one code associated with the at least one crypto-object includes instructions for the user to select the at least one cryptographic object.

10. The method of claim 2, wherein the plurality of cryptographic shares is a combination of at least one of, the device fingerprint of the user device (102), the device number of the user device (102), the user consent received from the user device (102) in response to the enforcement challenge request, the at least one crypto-object generated for the validation of the user, and an application identifier (ID) of the at least one application.

11. The method of claim 2, further comprising creating, by the authentication server (104), a transaction identifier (TXID) for the at least one application.

12. The method of claim 2, further comprising:
    distributing, by the authentication server (104), the generated plurality of cryptographic shares among the user device (102), the authentication server (104), and an escrow server (106) by:
    storing at least one first cryptographic share of the generated plurality of cryptographic shares as at least one authentication server cryptographic share;
    sending at least one second cryptographic share of the generated plurality of cryptographic shares to the escrow server (106) as at least one escrow server cryptographic share, wherein the escrow server (106) is a part of the authentication server (104) or an independent server; and
    sending at least one third cryptographic share of the generated plurality of cryptographic shares and the created TXID to the user device (102) in response to the registration request message received from the user device (102).

13. The method of claim 12, further comprising:
    maintaining, by the authentication server (104), an authentication server mapping, wherein the authentication server mapping includes a mapping of the at least one authentication server cryptographic share with the device fingerprint of the user device (102), the device number of the user device (102), the user consent received from the user device (102) in response to the enforcement challenge request, and the at least one crypto-object generated for the validation of the user;
    enabling, by the authentication server (104), the escrow server (106) to maintain an escrow server mapping, wherein the escrow server mapping includes a mapping of the at least one escrow server cryptographic share with the device fingerprint of the user device (102); and
    enabling, by the authentication server (104), the user device (102) to maintain a user device mapping, wherein the user device mapping includes a mapping of the TXID, the at least one application, and the at least one user device cryptographic share.

14. The method of claim 1, further comprising:
    sending, by the authentication server (104), an authentication failure message to the user device (102), if the obtained at least one of, device fingerprint of the user device (102), device number of the user device (102), user consent, and at least one crypto-object does not match with the device fingerprint of the user device (102), the device number of the user device (102), the user consent, and the at least one crypto-object stored in the authentication server mapping.

15. The method of claim 1, wherein authenticating the user includes:
    combining the at least one user device cryptographic share, the authentication server cryptographic share, and the at least one escrow server cryptographic share;
    comparing the combination of the at least one user device cryptographic share, the authentication server cryptographic share, and the at least one escrow server cryptographic share with the plurality of cryptographic shares generated for the device fingerprint of the user device (102) at a time of registering the at least one application;

determining that the user is not an authenticated user if the combination of the at least one user device cryptographic share, the authentication server cryptographic share, and the at least one escrow server cryptographic share does not match with the plurality of cryptographic shares and sending an authentication failure message to the user device (102); and determining that the user is an authenticated user if the combination of the at least one user device cryptographic share, the authentication server cryptographic share, and the at least one escrow server cryptographic share matches with the generated plurality of cryptographic shares and sending a successful authentication message to the user device (102).

16. The method of claim 1, further comprising:

destroying, by the authentication server (104), the plurality of cryptographic shares generated for the user device (102), on determining that the user of the user device (102) is the authenticated user;

generated, by the authentication server (104), a plurality of new cryptographic shares;

distributing, by the authentication server (104), the plurality of new cryptographic shares among the user device (102), the authentication server (104), and the escrow server (106) for subsequent authentications; and creating and sending, by the authentication server (104), a new TXID to the user device (102).

17. The method of claim 1, further comprising; performing, by the authentication server (104) and a machine learning module, a fraud analysis during the registration of the at least one application and the authentication of the user, the method includes:

triggering a call to the user device (102);

receiving a calling number from the user device (102); and verifying the received calling number to perform the fraud analysis.

18. An authentication server (104) comprising:

a memory (302); and a controller (308) coupled to the memory (302) configured to:

generate a plurality of cryptographic shares on receiving a registration request from the user device (102) to register at least one application; and authenticate the user of the user device (102) based on the generated plurality of cryptographic shares to perform at least one transaction using the at least one application, on receiving an authentication request from the user device (102), wherein the controller (308) is configured to:

receive the device fingerprint, the TXID, and the at least one user device cryptographic share from the user device (102) in the authentication request;

decrypt the at least one user device cryptographic share to obtain at least one of, the device fingerprint of the user device (102), the device number of the user device (102), the user consent, and the at least one crypto-object;

match the obtained at least one of, device fingerprint of the user device (102), device number of the user device (102), user consent, and at least one crypto-object match with the device fingerprint of the user device (102), the device number of the user device (102), the user consent, and the at least one crypto-object stored in the authentication server mapping;

extract the at least one authentication server cryptographic share for the received device fingerprint of the user device (102) using the maintained authentication server mapping, if the obtained at least one of, device fingerprint of the user device (102), device number of the user device (102), user consent, and at least one crypto-object match with the device fingerprint of the user device (102), the device number of the user device (102), the user consent, and the at least one crypto-object stored in the authentication server mapping;

receive the at least one escrow server cryptographic share for the received device fingerprint of the user device (102) using the maintained escrow server mapping; and authenticate the user of the user device (102) using the at least one user device cryptographic share, the authentication server cryptographic share, and the at least one escrow server cryptographic share.

19. The authentication server (104) of claim 18, wherein the controller (308) is configured to:

receive a device fingerprint from the user device (102) in the registration request;

identify a device number of the user device (102) based on the received device fingerprint, wherein the device number includes one of, a device identifier, or a mobile number a subscriber identity module (SIM) identifier, an operating system id (OS) and an application id of the user device (102);

validate the user of the user device (102) using at least one cryptographic object (crypto-object), on identifying the device number of the user device (102); and generate the plurality of cryptographic shares using the received device fingerprint, and the device number of the user device (102), after validating the user successfully.

20. The authentication server (104) of claim 19, wherein the controller (308) is configured to:

send an enforcement challenge request to the user device (102) on identifying the device number of the user device (102), wherein the enforcement challenge request is a crypto-image;

receive a user consent from the user device (102), wherein the user consent indicates a user response to the enforcement challenge request; and verify the identified device number of the user device (102) by validating the user consent.

21. The authentication server (104) of claim 19, wherein the controller (308) is configured to:

generate the at least one crypto-object and at least one code for the at least one cryptographic object;

send the generated at least one crypto-object and the at least one code to the user device (102) to be displayed to the associated user, wherein the user selects the at least one crypto-object according to the associated at least one code;

receive the at least one crypto-object selected by the user from the user device (102); and determine that the user is a valid user if the at least one crypto-object selected by the user is in consistent with the associated at least one code.

22. The authentication server (104) of claim 19, wherein the controller (308) is further configured to: create a transaction ID (TXID) for the at least one application.

23. The authentication server (104) of claim 19, wherein the controller (308) is further configured to:
distribute the generated plurality of cryptographic shares among the user device (102), the authentication server (104), and an escrow server (106) by:
storing at least one first cryptographic share of the generated plurality of cryptographic shares as at least one authentication server cryptographic share;
sending at least one second cryptographic share of the generated plurality of cryptographic shares to the escrow server (106) as at least one escrow server cryptographic share, wherein the escrow server (106) is a part of the authentication server (104) or an independent server; and
sending at least one third cryptographic share of the generated plurality of cryptographic shares and the created TXID to the user device (102) in response to the registration request message received from the user device (102).

24. The authentication server (104) of claim 23, wherein the controller (308) is configured to:
maintain an authentication server mapping, wherein the authentication server mapping includes a mapping of the at least one authentication server cryptographic share with the device fingerprint of the user device (102), the device number of the user device (102), the user consent received from the user device (102) in response to the enforcement challenge request, and the at least one crypto-object generated for the validation of the user;
enable the escrow server (106) to maintain an escrow server mapping, wherein the escrow server mapping includes a mapping of the at least one escrow server cryptographic share with the device fingerprint of the user device (102); and
enable the user device (102) to maintain a user device mapping, wherein the user device mapping includes a mapping of the TXID, the at least one application, and the at least one user device cryptographic share.

25. The authentication server (104) of claim 18, wherein the controller (308) is configured to:
combine the at least one user device cryptographic share, the authentication server cryptographic share, and the at least one escrow server cryptographic share;
compare the combination of the at least one user device cryptographic share, the authentication server cryptographic share, and the at least one escrow server cryptographic share with the plurality of cryptographic shares generated for the device fingerprint of the user device (102) at a time of registering the at least one application;
determine that the user is not an authenticated user if the combination of the at least one user device cryptographic share, the authentication server cryptographic share, and the at least one escrow server cryptographic share does not match with the plurality of cryptographic shares and sending an authentication failure message to the user device (102); and
determine that the user is an authenticated user if the combination of the at least one user device cryptographic share, the authentication server cryptographic share, and the at least one escrow server cryptographic share matches with the generated plurality of cryptographic shares and sending a successful authentication message to the user device (102).

26. The authentication server (104) of claim 18, wherein the controller (308) is configured to:
destroy the plurality of cryptographic shares generated for the user device (102), on determining that the user of the user device (102) is the authenticated user;
generate a plurality of new cryptographic shares;
distribute the plurality of new cryptographic shares among the user device (102), the authentication server (104), and the escrow server (106) for subsequent authentications; and
create and send a new TXID to the user device (102).

27. The authentication server (104) of claim 18, wherein the controller (308) and a machine learning module are configured to perform a fraud analysis during the registration of the at least one application and the authentication of the user by:
triggering a call to the user device (102);
receiving a calling number from the user device (102); and
verifying the received calling number to perform the fraud analysis.

28. A user device (102) comprising:
a memory (202); and
a controller (210) coupled to the memory (202) configured to:
send a registration request to an authentication server (104) to register at least one application, when the user wants to perform at least one transaction using the at least one application, wherein the registration request includes a device fingerprint of the user device (102);
receive an enforcement challenge request from the authentication server (104), when the authentication server (104) identifies a device number of the user device (102) based on the device fingerprint of the user device (102) in the registration request, wherein the device number of the user device (102) includes one of, a device identifier or a mobile number of the user device (102);
send a user consent to the authentication server (104) for verifying the identified device number of the user device (102), wherein the user consent includes a user response for the received enforcement challenge;
receive at least one cryptographic object (crypto-object) and at least one code from the authentication server (104) in response to the sent registration request;
provide a user crypto consent to the authentication server (104), wherein the user crypto consent includes a selection of the at least one crypto-object by the user in accordance with the associated code;
receive a transaction identifier (TXID) for the at least one application, and at least one user device cryptographic share from the authentication server (104), when authentication server (104) validates the user successfully based on the user consent; and
create and store user device mapping in the memory (202), wherein the user device mapping includes a mapping of the TXID of the at least one application, an application identifier (ID), and the at least one user device cryptographic share.

29. The user device (102) of claim 28, wherein the controller (210) is configured to:
send an authentication request to the authentication server (104), when the user wants to perform the at least one transaction using the registered at least one application, wherein the authentication request includes the device fingerprint of the user device (102), the TXID of the at least one application, and the at least one user device cryptographic share; and enable the user to perform the at least one transaction using the registered at least one application, on receiving a successful authentication message from the authentication server (104) in response to the sent authentication request.

30. An escrow server (106) comprising:

a memory (402); and a controller (406) configured to the memory (402) configured to:
- receive at least one escrow server cryptographic share and a device fingerprint of a user device (102) from an authentication server (104), at a time of registering at least one application of the user device (102);
- create and store an escrow server mapping in the memory (402), wherein the escrow server mapping includes a mapping of the at least one escrow server cryptographic share with the device fingerprint of the user device (102); and
- receive a request from the authentication server (104) for the at least one escrow server cryptographic share, at a time of authentication of a user of the user device (102) to perform at least one transaction using the at least one registered application;
- fetch the at least one escrow server cryptographic share for the received device fingerprint of the user device (102) using the escrow server mapping; and
- send the fetched at least one escrow server cryptographic share to the authentication server (104).

* * * * *